United States Patent
Allgeuer et al.

(10) Patent No.: US 6,946,182 B1
(45) Date of Patent: *Sep. 20, 2005

(54) FRINGED SURFACE STRUCTURES OBTAINABLE IN A COMPRESSION MOLDING PROCESS

(76) Inventors: Thomas T. Allgeuer, Felsenrainstrasse 7a, CH-8832 Wollerau SZ (CH); Selim Bensason, 5526 Cheena Dr., Houston, TX (US) 77096; Pak-Wing S. Chum, 126 Juniper St., Lake Jackson, TX (US) 77566; Jacquelyne A. Degroot, 349 Timbercrook, Lake Jackson, TX (US) 77566; Robert H. Kelch, 2006 Sylvan La., Midland, MI (US) 48640; Wenbin Liang, 6319 Aspen Cove Ct., Sugarland, TX (US) 77487; Antonio Torres, 1506 Foxwood Dr., Midland, MI (US) 48642; Werner Wagner, c/o Dels Estranys 69, Urb. Bon Air, ES-07409 Mallorca-Alcudia (ES)

( * ) Notice: Subject to any disclaimer, the term of this patent is extended or adjusted under 35 U.S.C. 154(b) by 61 days.

This patent is subject to a terminal disclaimer.

(21) Appl. No.: 10/031,304
(22) PCT Filed: Jul. 17, 2000
(86) PCT No.: PCT/US00/19320
§ 371 (c)(1),
(2), (4) Date: Aug. 9, 2002
(87) PCT Pub. No.: WO01/05574
PCT Pub. Date: Jan. 25, 2001

Related U.S. Application Data
(60) Provisional application No. 60/153,793, filed on Sep. 14, 1999, and provisional application No. 60/144,306, filed on Jul. 16, 1999.

(51) Int. Cl.$^7$ .............................. B32B 3/02; B32B 33/00
(52) U.S. Cl. ............... 428/92; 428/85; 428/88; 428/97; 428/159; 428/160; 428/172; 428/213; 428/215; 428/220; 264/134; 264/164; 264/243
(58) Field of Search .......................... 428/85, 913, 97, 428/215, 220, 88, 159, 160, 213, 172, 91–93, 400; 264/134, 164, 243

(56) References Cited

U.S. PATENT DOCUMENTS

| | | | |
|---|---|---|---|
| 3,399,425 A | | 9/1968 | Lemelson |
| 3,600,260 A | * | 8/1971 | Watanabe .................... 428/85 |
| 3,809,734 A | * | 5/1974 | Watanabe .................... 264/51 |

(Continued)

FOREIGN PATENT DOCUMENTS

| | | |
|---|---|---|
| CA | 2324313 | 10/1999 |
| DE | 1964736 | 7/1970 |
| DE | 19524076 | 10/1996 |

(Continued)

*Primary Examiner*—Harold Pyon
*Assistant Examiner*—Patricia L. Nordmeyer
(74) *Attorney, Agent, or Firm*—O'Keefe, Egan & Peterman, LLP

(57) ABSTRACT

Disclosed are mono-layer or multi-layer films, sheets, or coatings wherein at least on layer comprises a fringed surface microstructure (1), a process for making these items and uses thereof. Further disclosed are articles of manufacture comprising such film, sheet, or coating.

34 Claims, 2 Drawing Sheets

U.S. PATENT DOCUMENTS

| | | | | |
|---|---|---|---|---|
| 3,814,791 A | | 6/1974 | Jones | 264/164 |
| 3,895,153 A | | 7/1975 | Johnston et al. | 428/141 |
| 3,983,278 A | | 9/1976 | Wardle | 428/92 |
| 3,987,228 A | * | 10/1976 | Hemming | 428/91 |
| 4,174,991 A | * | 11/1979 | Reuben | 156/242 |
| 4,183,889 A | | 1/1980 | Brendel | 264/134 |
| 4,189,336 A | | 2/1980 | Hutflesz | 156/72 |
| 4,257,755 A | | 3/1981 | Lemelson | 425/168 |
| 4,308,649 A | | 1/1982 | Gilpatrick et al. | 26/2 R |
| 4,451,419 A | | 5/1984 | Bye et al. | 264/164 |
| 4,463,045 A | | 7/1984 | Ahr et al. | 428/131 |
| 4,629,643 A | | 12/1986 | Curro et al. | 428/131 |
| 4,927,682 A | * | 5/1990 | Nagura et al. | 428/88 |
| 5,099,553 A | | 3/1992 | Dischler | 26/2 R |
| 5,192,484 A | | 3/1993 | Matuzawa et al. | 264/555 |
| 5,407,735 A | * | 4/1995 | Fukuda et al. | 428/92 |
| 5,505,747 A | | 4/1996 | Chesley et al. | 51/297 |
| 5,518,865 A | | 5/1996 | Hoessel et al. | 430/326 |
| 5,733,628 A | | 3/1998 | Pelkie | 428/138 |
| 5,792,411 A | | 8/1998 | Morris et al. | 264/400 |
| 5,814,413 A | | 9/1998 | Beerwart | 428/516 |
| 5,815,840 A | * | 10/1998 | Hamlin | 2/161.6 |
| 5,989,235 A | * | 11/1999 | Quacquarella et al. | 604/332 |
| 6,312,786 B1 | | 11/2001 | Schwinn | 428/143 |
| 6,511,734 B1 | | 1/2003 | Wagner | 428/152 |

FOREIGN PATENT DOCUMENTS

| | | |
|---|---|---|
| DE | 19605788 | 5/1997 |
| DE | 19731315 | 1/1999 |
| DE | 19812097 | 9/1999 |
| DE | 19843109 | 3/2000 |
| EP | 0089746 | 9/1983 |
| EP | 0275653 | 7/1988 |
| EP | 309073 | 3/1989 |
| EP | 0899086 | 3/1999 |
| GB | 919100 | 2/1963 |
| GB | 1158471 | 7/1969 |
| JP | 01014364 | 1/1989 |
| JP | 03 253341 | 11/1991 |
| WO | WO 96/13979 | 5/1996 |
| WO | WO 97/02128 | 2/1997 |
| WO | WO 99/06623 | 2/1999 |
| WO | WO 99/16608 | 4/1999 |
| WO | WO 99/32272 | 7/1999 |
| WO | WO 99/54106 | 10/1999 |
| WO | WO 99/47339 | 11/1999 |
| WO | WO 00/16965 | 3/2000 |
| WO | WO 00/34562 | 6/2000 |

* cited by examiner

FRINGED SURFACE STRUCTURES OBTAINABLE IN A COMPRESSION MOLDING PROCESS

This application is a 35 U.S.C. §371 nationalized application of PCT/US00/19320, filed Jul. 17, 2000, which claims priority to U.S. provisional application Ser. No. 60/144,306 filed Jul. 16, 1999 and to U.S. provisional application Ser. No. 60/153,793, filed Sep. 14, 1999, incorporated herein by reference.

FIELD OF THE INVENTION

This invention relates to a surface having a fringed microstructure and to a mono-layer or multi-layer film, sheet, or coating characterized in that it comprises at least one layer which has or comprises a fringed surface microstructure. The invention also provides a process and a device to make such film, sheet, or coating, uses thereof, as well as articles of manufacture made therefrom.

BACKGROUND OF THE INVENTION

Plastic articles and items with a pleasant haptic appearance, such as a textile-like touch, and good optics are desirable for numerous applications, including hygienic products or garments. To improve aesthetics, for example of a plastic film, various techniques of surface modification resulting in various surface structures have been employed. Known surface-structured films include apertured films and non-apertured films.

Surface-structured apertured films include films wherein the aperture is in the plane of the film, irrespective of any surface structure or pattern, and films which are apertured through the surface feature, e.g. the protruberance.

For example, U.S. Pat. No. 4,629,643 provides a micro-apertured polymeric web exhibiting a pattern of discrete volcano-like aberrations, the end of which includes at least one micro-aperture at its point of maximum amplitude. The films are produced by impinging a jet of high pressure liquid on the exposed surface of a web of flat polymeric film while said film is supported on a fine mesh woven wire support member. The high pressure fluid jet causes micro-aperturing of those portions of the web which coincide with the interstices between the intersecting woven wire filaments comprising the support member and which correspond to the surface aberrations after removal of the web.

U.S. Pat. No. 5,733,628 discloses a film laminate wherein the carrier material comprises a woven or non-woven fibrous material and an elastomeric three-dimensional apertured film.

Non-apertured surface structured films include films with solid or with hollow surface structures.

According to U.S. Pat. No. 5,814,413 surface-texturing of a polymer film is accomplished by taking advantage of the usually undesired phenomenon of melt fracture. The patent discloses extruded films which due to melt fracture show a rough surface texture.

International Patent Application WO 97/02128 provides a process for producing a surface-structured, sheet-like semi-finished product made from thermoplastic polymers. The resulting product is reported to have a velour-like or velvety surface with numerous solid fibrous projections which can be longer than 3 millimeters. According to the disclosed process, the thermoplastic material is extruded in the molten state onto a moving belt or roller surface which is covered with cavities or borings having a depth of between 2 and 4 millimeters. The roller surface is exposed to a vacuum from the outside thus removing the air from the cavities and enabling these to be filled with the thermoplastic material. After solidification of the thermoplastic material, the semi-finished product covered with fiber-like projections is peeled off the surface.

International Patent Application WO 99/47339 describes a method for producing a surface-structured, film-like semi-finished product from a thermoplastic comprising forming a pile consisting of solid protuberances and elongating the protruberances by combing, brushing, knife-coating and/or shear pinching.

International Patent Application WO 99/16608 discloses a method for making an embossed oriented film. Said method discloses the steps of softening at least one of the two major surfaces of an oriented film, embossing the softened surface (s), and cooling the resulting embossed oriented thermoplastic film. In order to maintain orientation the combined steps of softening, embossing and cooling should occur within a second.

International Patent Application WO 99/06623 provides a unitary polymer substrate having a plurality of solid microfibers which may have a variety of forms, such as frayed-end microfibers, tapered microfibers, microfibers having an expanded cross-sectional shape and microfibers having a high aspect ratio. The microfibers are reported to increase the surface area and to impart a cloth-like feel.

International Patent Application WO 00/16965 relates to a method for producing a surface-structured, film-like semi-finished product made of a thermoplastic which is applied onto a surface covered with fine cavities. The solidified plastic is removed from the surface as a structured film. The disclosed structure is a pile comprised of solid projections and naps which may be stretched, e.g. by brushing.

Films with bubble-like surface features which are hollow from the bottom are disclosed, for example, in U.S. Pat. No. 4,463,045, International Patent Application WO 96/13979 and U.S. Pat. No. 5,192,484.

U.S. Pat. No. 5,792,411 suggests replicated articles with surface structures which have a suction cup geometric configuration.

There still is the need for plastic articles showing improved properties, particularly excellent aesthetics, as reflected in a textile-like haptic appearance and low gloss. Further representative properties desirable for plastic articles include, for example, increased surface area, variability of the surface appearance, anti-slip behavior, controlled storage, release or carrier properties, controlled thermal and barrier performance, as well as any combination thereof.

It is an object of the present invention to meet these needs. It is an object of the present invention to provide surface-structured plastic films, sheets or coatings with hollow surface structures which can be specifically designed to meet the desired performance attribute(s) and can be produced in a cost effective way. In particular, it is one object of the present invention to provide a plastic article having a soft, velvety and cloth-like touch in combination with a mat appearance. It is another object to provide a plastic article having an increased surface area. It is yet a further object of the present invention to provide a plastic article with an imprintable surface. The present invention also addresses the problem of providing a plastic article having a frictional behavior indicating anti-slip properties. It is a particular object of the present invention to provide a plastic article, which displays any desired combination of the above-mentioned properties, and may afford additional advantageous performance attributes depending on the intended end-use application(s).

The objects of the present invention are achieved by providing a film, sheet, or coating, which is characterized by a distinct morphology. Such morphology is reflected in the presence of at least one layer having a fringed surface microstructure and, optionally, of further layers affording certain additional functions, for example, heat sealability, bulk or mechanical properties. The morphology and composition of the film, sheet or coating of the invention can be tailored to satisfy the particular requirements of the production process and the intended end-use application(s).

SUMMARY OF THE INVENTION

The present invention pertains to a mono-layer or multi-layer film, sheet, or coating. The film, sheet or coating of the invention comprises at least one layer which is a thermoplastic polymeric material and which is characterized by a fringed surface microstructure. The fringes of said microstructure are non-perforated crater-like peaks which are at least partially hollow. The density of the fringes is at least 1000 per square centimeter, or higher. The layer may be covered by the fringed surface microstructure in its entirety, or in part, e.g. in one area or in several areas. The fringed surface microstructure may be discernible with the naked eye or on appropriate magnification.

Another aspect of the invention relates to a composite comprising a mono-layer or multi-layer film, sheet, or coating based on a thermoplastic polymeric material wherein at least one layer has a fringed surface microstructure.

Another aspect of the invention relates to an article of manufacture comprising or made from a mono-layer or multi-layer film, sheet, or coating based on a thermoplastic polymeric material wherein at least one layer has a fringed surface microstructure.

Another aspect of the invention relates to a process for making the film, sheet, or coating based on a thermoplastic polymeric material wherein at least one layer has a fringed surface microstructure, said process comprising:

providing a precursor film, sheet, or coating with a surface characterized by a pattern of peaks and valleys, and treating said precursor such as to create a surface having a fringed microstructure.

Preferably, the treatment is mechanical in nature.

Yet another aspect of the invention relates to the use of a mono- or multilayer film, sheet, or coating which is based on a thermoplastic polymeric material and wherein at least one layer has or comprises the fringed surface microstructure in applications or articles which benefit from the advantageous properties and performance attributes provided by the fringed surface microstructure.

DETAILED DESCRIPTION OF THE INVENTION

Basic Definitions

Figure 1:
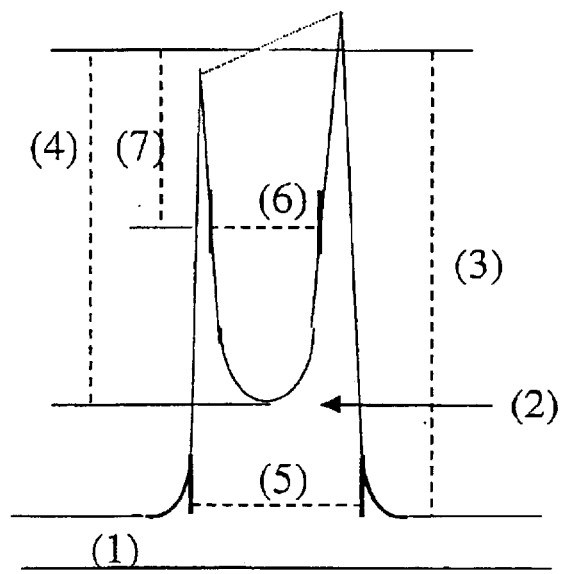
FIG. 1 shows an exemplary individual fringe and selected parameters characterizing its three-dimensional structure.

The term "film" as used herein refers to a thin article and includes strips, tapes, and ribbons. The article has a flat form and a thickness of about 10 mils (250 microns ($\mu$m) or micrometer), or less. Thickness data for a film having a fringed surface microstructure generally exclude the fringe height.

The term "sheet" as used herein refers to a flat article having a thickness of greater than about 10 mils (250 microns).

The term "coating" as used herein refers to a material applied over or on top of a substrate material. The substrate material (or its surface) can be of any shape, form or contour. For example, a film, profile or molding may be coated or comprise a coating. Also, the substrate surface can be made from a thermoplastic or a non-thermoplastic material such as, for example, but not limited to, polyethylene, polypropylene, paper, glass, ceramic, cardboard, foil, wood or wood-based materials, such as particleboard or fiberboard, and metal, such as copper.

The term "multi-layer film, sheet, or coating" (including each individually e.g. "multi-layer film") as used herein indicates a film, sheet, or coating consisting of two, three, four, five, six, seven or more layers.

The term "foamed film, sheet, or coating" (including each individually e.g. "foamed film") as used herein refers to a mono-layer or multi-layer structure wherein at least one layer of the structure is foamed and has a density less than the non-foamed polymer.

The term "composite" as used herein refers to a multi-layer or multi-component article or material comprising at least one film, sheet, or coating layer having a fringed surface structure, (including, for example, but not limited to, a fabric or a laminated structure which may comprise, for example foil or paper).

The term "polymeric material" as used herein refers to a polymeric compound obtainable by polymerizing one or more monomers. The generic term "polymeric compound" or "polymer" is intended to include a homopolymer, usually employed to refer to polymers prepared from only one monomer, and an interpolymer as defined hereinafter.

The term "comprising" as used herein means "including".

The term "interpolymer" as used herein refers to polymers prepared by the polymerization of at least two monomers. The generic term interpolymer thus embraces the terms copolymer, usually employed to refer to polymers prepared from two different monomers, and polymers prepared from more than two different monomers, such as terpolymers.

Unless specified otherwise, the term "alpha-olefin" ("$\alpha$-olefin") as used herein refers to an aliphatic or cyclo-aliphatic alpha-olefin having at least 3, preferably 3 to 20 carbon atoms.

Unless indicated to the contrary, all parts, percentages and ratios are by weight. The expression "up to" when used to specify a numerical range includes any value less than or equal to the numerical value which follows this expression. The expressions "cc" or "ccm" stand for "cubic centimeters".

Thermoplastic Materials

The film, sheet, or coating of the invention is based on or made from one or more thermoplastic polymeric materials, including, for example, latex. Preferred thermoplastic polymeric materials are semicrystalline polymers, amorphous polymers, or blends thereof. Advantageously, suitable thermoplastic polymers may be selected from the group consisting of polyolefins, poly(lactide), alkenyl aromatic polymers, thermoplastic polyurethanes, polycarbonates, polyamides, polyethers, thermoplastic phenoxy resins, polyvinyl chloride polymers, polyvinylidene chloride polymers and polyesters, including certain elastomers and block polymers. Semicrystalline thermoplastic materials and blends thereof are preferred.

Suitable polyolefins include, for example, ethylene-based polymers, including ethylene homopolymer and interpolymer, aliphatic alpha-olefin homopolymers, such as polypropylene, polybutene and polyisoprene, and their interpolymers.

Ethylene homopolymers, for example low density polyethylene (LDPE) and high density polyethylene (HDPE), and ethylene interpolymers are known classes of thermoplastic polymers, each having many members. They are prepared by homopolymerizing ethylene or interpolymerizing (for example, copolymerizing) ethylene with one or more vinyl- or diene-based comonomers, for example, α-olefins of 3 to about 20 carbon atoms, vinyl esters, vinyl acids, styrene-based monomers, monomers containing two or more sites of ethylenic unsaturation, etc., using known copolymerization reactions and conditions.

Ethylene (based) polymers suitable for use in the present invention include both homogeneously branched (homogeneous) polymers and heterogeneously branched (heterogeneous) polymers.

Homogeneous polymers encompass ethylene-based interpolymers in which any comonomer is randomly distributed within a given interpolymer molecule and substantially all of the interpolymer molecules have the same ethylene/comonomer ratio within that interpolymer. Homogeneous ethylene polymers generally are characterized as having an essentially single melting (point) peak between −30° C. and 150° C., as determined by differential scanning calorimetry (DSC). The single melting peak may be relatively broad, such as is the case when an ethylene polymer having a crystallinity of less than about 36 percent is employed. The single melting peak may be sharp, such as is the case when an ethylene polymer having a crystallinity of at least about 36 percent is employed.

Typically, homogeneous ethylene polymers will also have a relatively narrow molecular weight distribution (MWD) as compared to corresponding heterogeneous ethylene polymers. Preferably, the molecular weight distribution defined as the ratio of weight average molecular weight to number average molecular weight ($M_w/M_n$), is less than about 3.5 (when the density of the interpolymer is less than about 0.960 g/cc), more preferably less than about 3.0.

In addition or in the alternative, the homogeneity of the ethylene-based polymers is reflected in a narrow composition distribution, which can be expressed using parameters such SCBDI (Short Chain Branch Distribution Index) or (CDBI Composition Distribution Branch Index). The SCBDI of a polymer is readily calculated from data obtained from techniques known in the art, such as, for example, temperature rising elution fractionation (abbreviated herein as "TREF") as described, for example, in Wild et al, Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. CDBI is defined as the weight percent of the polymer molecules having a comonomer content within 50 percent of the median total molar comonomer content. The SCBDI or CDBI for the homogeneous linear and substantially linear ethylene/alpha-olefin polymers used in the present invention is typically greater than about 50 percent.

The homogeneous ethylene polymers that can be used in the present invention fall into two broad categories, the linear homogeneous ethylene polymers and the substantially linear homogeneous ethylene polymers. Both are known.

Homogeneous linear ethylene polymers have long been commercially available. As exemplified in U.S. Pat. No. 3,645,992 to Elston, homogeneous linear ethylene polymers can be prepared in conventional polymerization processes using Ziegler-type catalysts such as, for example, zirconium and vanadium catalyst systems. U.S. Pat. No. 4,937,299 to Ewen et al. and U.S. Pat. No. 5,218,071 to Tsutsui et al. disclose the use of metallocene catalysts, such as catalyst systems based on hafnium, for the preparation of homogeneous linear ethylene polymers. Commercially available examples of homogeneous linear ethylene polymers include, for example, those sold by Mitsui Petrochemical Industries as TAFMER™ resins and by Exxon Chemical Company as EXACT™ and EXCEED™ resins.

The substantially linear ethylene polymers (SLEPs) are homogeneous polymers having long chain branching.

The term "substantially linear ethylene polymer" as used herein means that the bulk ethylene polymer is substituted, on average, with about 0.01 long chain branches/1000 total carbons to about 3 long chain branches/1000 total carbons (wherein "total carbons" includes both backbone and branch carbon atoms). Preferred polymers are substituted with about 0.01 long chain branches/000 total carbons to about 1 long chain branches/1000 total carbons, more preferably from about 0.05 long chain branches/1000 total carbons to about 1 long chain branched/1000 total carbons, and especially from about 0.3 long chain branches/1000 total carbons to about 1 long chain branches/1000 total carbons.

As used herein, the term "backbone" refers to a discrete molecule, and the term "polymer" or "bulk polymer" refers, in the conventional sense, to the polymer as formed in a reactor. For the polymer to be a "substantially linear ethylene polymer", the polymer must have at least enough molecules with long chain branching such that the average long chain branching in the bulk polymer is at least an average of from about 0.01/1000 total carbons to about 3 long chain branches/1000 total carbons.

The term "bulk polymer" as used herein means the polymer which results from the polymerization process as a mixture of polymer molecules and, for substantially linear ethylene polymers, includes molecules having an absence of long chain branching as well as molecules having long chain branching. Thus a "bulk polymer" includes all molecules formed during polymerization. It is understood that, for the substantially linear polymers, not all molecules have long chain branching, but a sufficient amount do such that the average long chain branching content of the bulk polymer positively affects the melt rheology (i.e., the melt fracture properties) as described herein below and elsewhere in the literature.

Long chain branching (LCB) is defined herein as a chain length of at least one (1) carbon (atom) less than the number of carbons in the comonomer, whereas short chain branching (SCB) is defined herein as a chain length of the same number of carbons in the residue of the comonomer after it is incorporated into the polymer molecule backbone. For example, a substantially linear ethylene/1-octene polymer has backbones with long chain branches of at least seven (7) carbons in length, but it also has short chain branches of only six (6) carbons in length.

Long chain branching can be distinguished from short chain branching by using $^{13}C$ nuclear magnetic resonance (NMR) spectroscopy and to a limited extent, e.g. for ethylene homopolymers, it can be quantified using the method of Randall, (*Rev. Macromol. Chem. Phys.*, C29 (2&3), p. 285–297), the disclosure of which is incorporated herein by reference. However as a practical matter, current $^{13}C$ nuclear magnetic resonance spectroscopy cannot determine the length of a long chain branch in excess of about six (6) carbon atoms and as such, this analytical technique cannot distinguish between a seven (7) carbon branch and a seventy (70) carbon branch. The long chain branch can be as long as about the same length as the length of the polymer backbone.

Although conventional $^{13}C$ nuclear magnetic resonance spectroscopy cannot determine the length of a long chain branch in excess of six carbon atoms, there are other known techniques useful for quantifying or determining the presence of long chain branches in ethylene polymers, including ethylene/1-octene interpolymers. For example, U.S. Pat. No. 4,500,648, incorporated herein by reference, teaches that long chain branching frequency (LCB) can be represented by the equation $LCB=b/M_w$, wherein b is the weight average number of long chain branches per molecule and $M_w$ is the weight average molecular weight. The molecular weight averages and the long chain branching characteristics are determined by gel permeation chromatography and intrinsic viscosity methods, respectively.

Two other useful methods for quantifying or determining the presence of long chain branches in ethylene polymers, including ethylene/1-octene interpolymers are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., *J. Chem. Phys.*, 17, 1301 (1949) and Rudin, A., *Modern Methods of Polymer Characterization*, John Wiley & Sons, New York (1991) pp. 103–112, the disclosures of both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is indeed a useful technique for quantifying the presence of long chain branches in substantially linear ethylene polymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

DeGroot and Chum also showed that a plot of log($I_2$, melt index) as a function of log(GPC Weight Average Molecular Weight) as determined by GPC-DV Illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

For substantially linear ethylene polymers, the empirical effect of the presence of long chain branching is manifested as enhanced rheological properties which are quantified and expressed in terms of gas extrusion rheometry (GER) results and/or melt flow, $I_{10}/I_2$, increases.

The substantially linear ethylene polymers suitable for the purpose of the present invention are a unique class of compounds that are further defined in U.S. Pat. No. 5,272,236, U.S. Pat. No. 5,278,272, and U.S. Pat. No. 5,665,800, each of which is incorporated herein by reference. SLEPs are available from The Dow Chemical Company as polymers made by the INSITE™ Process and Catalyst Technology, such as AFFINITY™ polyolefin plastomers (POPs), and from DuPont Dow Elastomers, L.L.C. as ENGAGE™ polyolefin elastomers (POEs).

Substantially linear ethylene polymers differ significantly from the class of polymers conventionally known as homogeneously branched linear ethylene polymers described above. As an important distinction, substantially linear ethylene polymers do not have a linear polymer backbone in the conventional sense of the term "linear" as is the case for homogeneously branched linear ethylene polymers. Substantially linear ethylene polymers also differ significantly from the class of polymers known conventionally as heterogeneously branched traditional Ziegler polymerized linear ethylene interpolymers (for example, ultra low density polyethylene, linear low density polyethylene (LLDPE) or high density polyethylene (HDPE) made, for example, using the technique disclosed by Anderson et al. in U.S. Pat. No. 4,076,698, in that substantially linear ethylene interpolymers are homogeneously branched polymers; that is, substantially linear ethylene polymers have a SCBDI greater than or equal to 50 percent, preferably greater than or equal to 70 percent, more preferably greater than or equal to 90 percent. Substantially linear ethylene polymers also differ from the class of heterogeneously branched ethylene polymers in that substantially linear ethylene polymers are characterized as essentially lacking a measurable high density or crystalline polymer fraction as determined using a temperature rising elution fractionation technique.

The substantially linear ethylene polymer for use in the present invention can be characterized as having (a) melt flow ratio, $I_{10}/I_2 \cdot 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$ and $M_w/M_n$ within ten percent of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between −30° C. and 150° C., and (e) a short chain branching distribution index greater than 50 percent.

Determination of the critical shear rate and critical shear stress in regards to melt fracture as well as other rheology properties such as "rheological processing index" (PI), is performed using a gas extrusion rheometer (GER). The gas extrusion rheometer is described by M. Shida, R. N. Shroff and L. V. Cancio in *Polymer Engineering Science*. Vol. 17, No. 11, p. 770 (1977) and in *Rheometers for Molten Plastics* by John Dealy, published by Van Nostrand Reinhold Co. (1982) on pp. 97–99, the disclosures of both of which are incorporated herein by reference.

The processing index (PI) is measured at a temperature of 190° C., at nitrogen pressure of 2500 psig using a 0.0296 inch (752 micrometers) diameter (preferably a 0.0143 inch diameter die for high flow polymers, e.g. 50–100 $I_2$ melt index or greater), 20:1 L/D die having an entrance angle of 180°. The GER processing index is calculated in millipoise units from the following equation:

$$PI = 2.15 \times 10^6 \text{ dyne/cm}^2/(1000 \times \text{shear rate}),$$

wherein: $2.15 \times 10^6$ dyne/cm$^2$ is the shear stress at 2500 psi, and the shear rate is the shear rate at the wall as represented by the following equation:

$$32 \, Q'/(60 \text{ sec/min})(0.745)(\text{Diameter} \times 2.54 \text{ cm/in})^3,$$

wherein:

Q' is the extrusion rate (gms/min), 0.745 is the melt density of polyethylene (gm/cm$^3$), and Diameter is the orifice diameter of the capillary (inches).

The PI is the apparent viscosity of a material measured at apparent shear stress of $2.15 \times 10^6$ dyne/cm$^2$.

For substantially linear ethylene polymers, the PI is less than or equal to 70 percent of that of a conventional linear ethylene polymer having an $I_2$, $M_w/M_n$ and density each within ten percent of the substantially linear ethylene polymer.

An apparent shear stress vs. apparent shear rate plot is used to identify the melt fracture phenomena over a range of nitrogen pressures from 5250 to 500 psig using the die or GER test apparatus previously described. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized at the beginning of losing extrudate gloss at which the surface roughness of extrudate can only be detected by 40× magnification. The critical shear rate at onset of surface melt fracture for the substantially linear ethylene polymers is at least 50 percent greater than the critical shear rate at the onset of surface melt fracture of a linear ethylene polymer having about the same $I_2$ and $M_w/M_n$. Preferably, the critical shear stress at onset of surface melt fracture for the substantially linear ethylene polymers of the invention is greater than about $2.8 \times 10^6$ dyne/cm$^2$.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and critical shear stress at onset of gross melt fracture (OGMF) will be used herein based on the changes of surface roughness and configurations of the extrudates extruded by a GER. For the substantially linear ethylene polymers used in the invention, the critical shear stress at onset of gross melt fracture is preferably greater than about $4 \times 10^6$ dyne/cm$^2$.

For the processing index determination and for the GER melt fracture determination, substantially linear ethylene polymers are tested without inorganic fillers and do not have more than 20 ppm aluminum catalyst residue. Preferably, however, for the processing index and melt fracture tests, substantially linear ethylene polymers do contain antioxidants such as phenols, hindered phenols, phosphites or phosphonites, preferably a combination of a phenol or hindered phenol and a phosphite or a phosphonite.

The molecular weight distributions of ethylene polymers are determined by gel permeation chromatography (GPC) on a Waters 150° C. high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968, the disclosure of which is incorporated herein by reference) to derive the following equation:

$$M_{polyethylene} = a \cdot (M_{polystyrene})^b$$

In this equation, a=0.4316 and b=1.0. Weight average molecular weight, $M_w$, is calculated in the usual manner according to the following formula:

$$M_j = (\Sigma w_i (M_i^j))^j;$$

wherein $w_i$ is the weight fraction of the molecules with molecular weight $M_i$ eluting from the GPC column in fraction i and j=1 when calculating $M_w$ and j=−1 when calculating $M_n$.

Substantially linear ethylene polymers are known to have excellent processability, despite having a relatively narrow molecular weight distribution (that is, the $M_w/M_n$ ratio is typically less than about 3.5). Surprisingly, unlike homogeneously and heterogeneously branched linear ethylene polymers, the melt flow ratio ($I_{10}/I_2$) of substantially linear ethylene polymers can be varied essentially independently of the molecular weight distribution, $M_w/M_n$.

Suitable constrained geometry catalysts for manufacturing substantially linear ethylene polymers include constrained geometry catalysts as disclosed in U.S. application Ser. No. 07/545,403, filed Jul. 3, 1990; U.S. application Ser.

No. 07/758,654, filed Sep. 12, 1991; U.S. Pat. No. 5,132,380; U.S. Pat. No. 5,064,802; U.S. Pat. No. 5,470,993; U.S. Pat. No. 5,453,410; U.S. Pat. No. 5,374,696; U.S. Pat. No. 5,532,394; U.S. Pat. No. 5,494,874; and U.S. Pat. No. 5,189,192, the teachings of all of which are incorporated herein by reference.

Suitable catalyst complexes may also be prepared according to the teachings of WO 93/08199, and the patents issuing therefrom, all of which are incorporated herein by reference. Further, the monocyclopentadienyl transition metal olefin polymerization catalysts taught in U.S. Pat. No. 5,026,798, which is incorporated herein by reference, are also believed to be suitable for use in preparing the polymers of the present invention, so long as the polymerization conditions substantially conform to those described in U.S. Pat. No. 5,272,236; U.S. Pat. No. 5,278,272 and U.S. Pat. No. 5,665,800, especially with strict attention to the requirement of continuous polymerization. Such polymerization methods are also described in PCT/US 92/08812 (filed Oct. 15, 1992).

The foregoing catalysts may be further described as comprising a metal coordination complex comprising a metal of groups 3–10 or the Lanthanide series of the Periodic Table of the Elements and a delocalize β-bonded moiety substituted with a constrain-inducing moiety, said complex having a constrained geometry about the metal atom such that the angle at the metal between the centroid of the delocalized, substituted pi-bonded moiety and the center of at least one remaining substituent is less than such angle in a similar complex containing a similar pi-bonded moiety lacking in such constrain-inducing substituent, and provided further that for such complexes comprising more than one delocalized, substituted pi-bonded moiety, only one thereof for each metal atom of the complex is a cyclic, delocalized, substituted pi-bonded moiety. The catalyst further comprises an activating cocatalyst.

Suitable cocatalysts for use herein include polymeric or oligomeric aluminoxanes, especially methyl aluminoxane, as well as inert, compatible, noncoordinating, ion forming compounds. So called modified methyl aluminoxane (MMAO) is also suitable for use as a cocatalyst. One technique for preparing such modified aluminoxane is disclosed in U.S. Pat. No. 5,041,584, the disclosure of which is incorporated herein by reference. Aluminoxanes can also be made as disclosed in U.S. Pat. No. 5,218,071; U.S. Pat. No. 5,086,024; U.S. Pat. No. 5,041,585; U.S. Pat. No. 5,041,583; U.S. Pat. No. 5,015,749; U.S. Pat. No. 4,960,878; and U.S. Pat. No. 4,544,762, the disclosures of all of which are incorporated herein by reference.

Aluminoxanes, including modified methyl aluminoxanes, when used in the polymerization, are preferably used such that the catalyst residue remaining in the (finished) polymer is preferably in the range of from about 0 to about 20 ppm aluminum, especially from about 0 to about 10 ppm aluminum, and more preferably from about 0 to about 5 ppm aluminum. In order to measure the bulk polymer properties (e.g. PI or melt fracture), aqueous HCl is used to extract the aluminoxane from the polymer. Preferred cocatalysts, however, are inert, noncoordinating, boron compounds such as those described in EP-A-0520732, the disclosure of which is incorporated herein by reference.

Substantially linear ethylene are produced via a continuous (as opposed to a batch) controlled polymerization process using at least one reactor (e.g., as disclosed in WO 93107187, WO 93107188, and WO 93/07189, the disclosure of each of which is incorporated herein by reference), but can also be produced using multiple reactors (e.g., using a multiple reactor configuration as described in U.S. Pat. No. 3,914,342, the disclosure of which is incorporated herein by reference) at a polymerization temperature and pressure sufficient to produce the interpolymers having the desired properties. The multiple reactors can be operated in series or in parallel, with at least one constrained geometry catalyst employed in at least one of the reactors.

Substantially linear ethylene polymers can be prepared via the continuous solution, slurry, or gas phase polymerization in the presence of a constrained geometry catalyst, such as the method disclosed in EP-A416,815, the disclosure of which is incorporated herein by reference. The polymerization can generally be performed in any reactor system known in the art including, but not limited to, a lank reactor(s), a sphere reactor(s), a recycling loop reactor(s) or combinations thereof and the like, any reactor or all reactors operated partially or completely adiabatically, nonadiabatically or a combination of both and the like. Preferably, a continuous loop-reactor solution polymerization process is used to manufacture the substantially linear ethylene polymer used in the present invention.

In general, the continuous polymerization required to manufacture substantially linear ethylene polymers may be accomplished at conditions well known in the prior art for Ziegler-Natta or Kaminsky-Sinn type polymerization reactions, that is, temperatures from 0 to 250° C. and pressures from atmospheric to 1000 atmospheres (100 MPa). Suspension, solution, slurry, gas phase or other process conditions may be employed if desired.

A support may be employed in the polymerization, but preferably the catalysts are used in a homogeneous (i.e., soluble) manner. It will, of course, be appreciated that the active catalyst system forms in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

Preferably, the substantially linear ethylene polymers used in the present invention are interpolymers of ethylene with at least one $C_3$–$C_{20}$ α-olefin and/or $C_4C_{18}$ diolefin, in accordance with the definitions and preferences given hereinbelow. Copolymers of ethylene and an α-olefin of $C_3$–$C_{20}$ carbon atoms are preferred.

Heterogeneous ethylene-based polymers encompass ethylene/α-olefin interpolymers characterized as having a linear backbone and a DSC melting curve having a distinct melting point peak greater than 115° C. attributable to a high density fraction. Such heterogeneous interpolymers win typically have a broader molecular weight distribution than homogeneous interpolymers, as reflected in a $M_w/M_n$ ratio of greater than about 3.5 (when the density of the interpolymer is less than about 0.960 g/cc). Typically, heterogeneous ethylene interpolymers have a CDBI of about 50% or less, indicating that such interpolymers are a mixture of molecule having differing comonomer contents and differing amounts of short chain branching.

The heterogeneous ethylene polymers that can be used in the of this invention fall into two broad categories, those prepared with a free radical initiator at high temperature and high pressure, and those prepared-with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 g/cc. Ethylene polymers and copolymer prepare by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an α-olefin. HDPE is well known, commercially available in various grades, and may be used in this invention.

Linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (for example, 1-butene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities of these linear polymers generally range from about 0.87 g/cc to about 0.91 g/cc.

Both the materials made by the free radical catalysts and by the coordination catalysts are well known in the art, as are their methods of preparation. For example, heterogeneous linear ethylene polymers are available from The Dow Chemical Company as DOWLEX™ LLDPE polymers and as ATTANE™ ULDPE resins. Heterogeneous linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 to Anderson et al., which is incorporated herein by reference.

As indicated above, the ethylene polymers suitable for the purpose of the present invention can be interpolymers of ethylene and at least one α-olefin. Suitable α-olefins for use as comonomers in a solution, gas phase or slurry polymerization process or combinations thereof include 1-propylene, 1-butene, 1-isobutylene, 1-pentene, 1-hexene, 4-methyl-1-pentene, 1-heptene and 1-octene, as well as other monomer types such as tetrafluoroethylene, vinyl benzocyclobutane, 1,4-hexadiene, 1,7-octadiene, and cycloalkenes, for example cyclopentene, cyclohexene, cyclooctene, norbornene (NB), and ethylidene norbornene (ENB)). Preferably, the α-olefin will be 1-butene, 1-pentene, 4-methyl-1-pentene, 1-hexene, 1-heptene, 1-octene, NB or ENB, or mixtures thereof. More preferably, the α-olefin will be 1-pentene, 1-hexene, 1-heptene, 1-octene, or mixtures thereof. Most preferably, the α-olefin will be 1-octene.

Ethylene/α-olefin/diene terpolymers may also be used as elastomeric polymers in this invention. Suitable α-olefins include the c-olefins described above as suitable for making ethylene α-olefin copolymers. The dienes suitable as monomers for the preparation of such terpolymers are typically non-conjugated dienes having from 6 to 15 carbon atoms. Representative examples of suitable non-conjugated dienes that may be used to prepare the terpolymer include:

a) Straight chain acyclic dienes such as 1,4-hexadiene, 1,5-heptadiene, and 1,6-octadiene;
b) branched chain acyclic dienes such as 5-methyl-1,4-hexadiene, 3,7-dimethyl-1-6-octadiene, and 3,7-dimethyl-1,7-octadiene;
c) single ring alicyclic dienes such as 4-vinylcyclohexene, 1-allyl-4-isopropylidene cyclohexane, 3-allylcyclopentene, 4-allylcyclohexene, and 1-isopropenyl-4-butenylcyclohexane;
d) multi-ring alicyclic fused and bridged ring dienes such as dicyclopentadiene; alkenyl, alkylidene, cycloalkenyl and cycloalkylidene norbornenes such as 5-methylene-2-norbornene, 5-methylene-6-methyl-2-norbornene, 5-methylene-6,6-dimethyl-2-norbornene, 5-propenyl-2-norbornene, 5-(3-cyclopentenyl)-2-norbornene, 5-ethylidene-2-norbornene, 5-cyclohexylidene-2-norbornene, etc.

The preferred dienes are selected from the group consisting of 1,4-hexadiene, dicyclopentadiene, 5-ethylidene-2-norbornene, 5-methylene-2-norbornene, 7-methyl-1,6-octadiene, piperylene, 4-vinylcyclohexene, etc.

The preferred terpolymers for the practice of the invention are terpolymers of ethylene, propylene and a non-conjugated diene (EPDM). Such terpolymers are commercially available. Ethylene/α-olefin/diene terpolymers are useful when it is desired to make elastomeric polymer blends vulcanizable with the well known sulfur compound vulcanization process.

Ethylene/unsaturated carboxylic acid, salt and ester interpolymers may also be used in this invention. These are interpolymers of ethylene with at least one comonomer selected from the group consisting of vinyl esters of a saturated carboxylic acid wherein the acid moiety has up to 4 carbon atoms, unsaturated mono- or dicarboxylic acids of 3 to 5 carbon atoms, a salt of the unsaturated acid, esters of the unsaturated acid derived from an alcohol having 1 to 8 carbon atoms, and mixtures thereof. Terpolymers of ethylene and these comonomers are also suitable. Ionomers, which are completely or partially neutralized copolymers of ethylene and the acids described above, are discussed in more detail in U.S. Pat. No. 3,264,272, already incorporated herein by reference. In addition, terpolymers of ethylene/vinyl acetate/carbon monoxide or ethylene/methyl acrylate/carbon monoxide containing up to about 15 percent by weight of carbon monoxide can also be employed.

Suitable ethylene/unsaturated carboxylic acid, salt and ester interpolymers include ethylene/vinyl acetate (EVA) including, but not limited to, the stabilized EVA described in U.S. Pat. No. 5,096,955, which is incorporated herein by reference; ethylene/acrylic acid (EAA) and its ionomers; ethylene/methacrylic acid and its ionomers; ethylene/methyl acrylate; ethylene/ethyl acrylate; ethylene/isobutyl acrylate; ethylene/normal butyl acrylate; ethylene/isobutyl acrylate/methacrylic acid and its ionomers; ethylene/normal butyl acrylate/methacrylic acid and its ionomers; ethylene/isobutyl acrylate/acrylic acid and its ionomers; ethylene/normal butyl acrylate/acrylic add and its ionomers; ethylene/methyl methacrylate; ethylene/vinyl acetate/methacrylic acid and its ionomers; ethylene/vinyl acetate/acrylic acid and its ionomers; ethylene/vinyl acetate/carbon monoxide; ethylene/methacrylate/carbon monoxide; ethylene/normal butyl acrylate/carbon monoxide; ethylene/isobutyl acrylate/carbon monoxide; ethylene/vinyl acetate/monoethyl maleate and ethylene/methyl acrylate/monoethyl maleate. Particularly suitable copolymers are EVA; EAA; ethylene/methyl acrylate; ethylene/isobutyl acrylate; and ethylene/methyl methacrylate copolyers and mixtures thereof. Certain properties, such as tensile elongation, are taught to be improved by certain combinations of these ethylene interpolymers described in U.S. Pat. No. 4,379,190, which is incorporated herein by reference. The procedures for making these ethylene interpolymers are well known in the art and many are commercially available.

Propylene based polymers are also suitable to make a film, sheet, or coating according to this invention. Such propylene based polymers are, for example, homopolypropylene and propylene interpolymers, such as copolymers of propylene with ethylene and/or a $C_4$–$C_{20}$ alpha-olefin, including impact copolymers and polypropylene random copolymers.

Further thermoplastic interpolymers suitable to practice the present invention are polyolefin interpolymers comprising i) polymer units derived from at least one of ethylene and/or an alpha-olefin monomer; and ii) polymer units derived from one or more vinyl or vinylidene aromatic monomers and/or one or more sterically hindered aliphatic or cycloaliphatic vinyl or vinylidene monomers, or a combination of at least one aromatic vinyl or vinylidene monomer, and iii) optionally polymer units derived from one or more ethylenically unsaturated polymerizable monomer(s) other than those derived from i) and ii).

Suitable α-olefins include, for example, α-olefins containing from 3 to about 20, preferably from 3 to about 12, more preferably from 3 to about 8 carbon atoms. These α-olefins do not contain an aromatic moiety. Particularly suitable are ethylene, propylene, butene-1,4-methyl-1-pentene, hexene-1 or octene-1 or ethylene in combination with one or more of propylene, butene-1,4-methyl-1 pentene, hexene-1 or octene-1.

Polymerizable ethylenically unsaturated monomer(s) include strained ring olefins such as norbornene and $C_1$–$C_{10}$ alkyl or $C_6$–$C_{10}$ aryl substituted norbornenes, with an exemplary interpolymer being ethylene/styrene/norbornene.

Suitable vinyl or vinylidene aromatic monomers include, for example, those represented by the following formula:

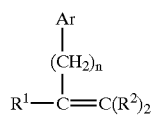

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_1$–$C_4$-alkyl, and $C_1$–$C_4$-haloalkyl: and n has a value from zero to about 4, preferably from zero to 2, most preferably zero. Exemplary vinyl aromatic monomers include styrene, vinyl toluene, x-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. The most preferred aromatic vinyl monomer is styrene.

By the term "sterically hindered aliphatic or cycloaliphatic vinyl or vinylidene compounds", it is meant addition polymerizable vinyl or vinylidene monomers corresponding to the formula:

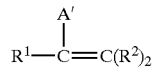

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system.

By the term "sterically bulky" it is meant that the monomer bearing this substituent is normally incapable of addition polymerization by standard Ziegler-Natta polymerization catalysts at a rate comparable with ethylene polymerizations.

Ethylene and alpha-olefins having a linear aliphatic structure such as propylene, butene-1, hexene-1 and octene-1 are not considered to be sterically hindered aliphatic monomers.

Preferred sterically hindered aliphatic or cycloaliphatic vinyl or vinylidene compounds are monomers in which one of the carbon atoms bearing ethylenic unsaturation is tertiarily or quaternarily substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene. Simple linear non-branched α-olefins including for example, α-olefins containing from 3 to about 20 carbon atoms such as propylene, butene-1,4-methyl-1-pentene, hexene-1 or octene-1 are not examples of sterically hindered aliphatic or cycloaliphatic vinyl or vinylidene compounds.

The interpolymers comprising polymer units defined above under i), ii) and iii) can be substantially random, pseudo-random, random, alternating, diadic, triadic, triadic or any combination thereof. That is, the interpolymer product can be variably incorporated and optionally variably sequenced. The preferred sequence is substantially random. The preferred substantially random interpolymers are the so-called pseudo-random interpolymers as described in EP-A0 416 815 by James C. Stevens et al. and U.S. Pat. No. 5,703,187 by Francis J. Timmers, both of which are incorporated herein by reference in their entirety.

The preferred polyolefin interpolymer are ethylene/styrene interpolymers. Particularly preferred are substantially random ethylene/styrene interpolymers.

The term "variably incorporated" as used herein refers to an interpolymer, particularly an ethylene/styrene interpolymer, manufactured using at least two catalyst systems wherein during interpolymerization the catalyst systems are operated at different incorporation or reactivity rates. For example, the interpolymer product having a total styrene content of 36 weight percent is variably incorporated where one catalyst system incorporates 22 weight percent styrene and the other catalyst system incorporates 48 weight percent styrene and the production split between the two catalyst systems is 47/53 weight percentages.

Representative "pseudo-random" interpolymers are the ethylene/styrene interpolymers described in U.S. Pat. No. 5,703,187, the disclosure of which is incorporated herein in its entirety by reference.

"Random" interpolymers are those in which the monomer units are incorporated into the chain such that there exist various combinations of ordering including blockiness, e.g. where either the ethylene or the aliphatic alpha-olefin monomer or the sterically hindered vinylidene monomer or both can be repeated adjacent to one another.

Representative "alternating" interpolymers are, for example, alternating ethylene/styrene interpolymers in which the ethylene and the sterically hindered vinylidene monomer occur in repeat alternate sequences on the polymer chain in atactic or stereospecific structures (such as isotactic or syndiotactic) or in combinations of the general formula $(AB)_n$.

The term "substantially random" as used herein in reference to the interpolymers comprising the above-mentioned monomers i), ii) and iii), and to ethylene/styrene interpolymers in particular, generally means that the distribution of the monomers of the interpolymer can be described by the Bernoulli statistical model or by a first or second order Markovian statistical model, as described by J. C. Randall in *Polymer Sequence Determination. Carbon*-13 *NMR Method*, Academic Press New York, 1977, pp. 71–78, the disclosure of which is incorporated herein by reference. Substantially random interpolymers do not contain more than 15 mole percent of the total amount of vinyl or vinylidene aromatic monomer in blocks of vinyl or vinylidene aromatic monomer of more than 3 units.

Preferably, the substantially random interpolymer is not characterized by a high degree (greater than 50 mole percent) of either isotacticity or syndiotacticity. This means that in the carbon-13 NMR spectrum of the substantially random interpolymer, the peak areas corresponding to the main chain methylene and methine carbons representing either meso diad sequences or racemic diad sequences should not exceed 75 percent of the total peak area of the main chain methylene and methine carbons.

A preferred method of preparation of the substantially random interpolymers includes polymerizing a mixture of polymerizable monomers in the presence of one or more metallocene or constrained geometry catalysts in combination with various cocatalysts, as described in EP-A-0,416,815 by James C. Stevens et al. and U.S. Pat. No. 5,703,187 by Francis J. Timmers, both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in EP-A-514,828); as well as U.S. Pat. No. : 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185, all of which patents and applications are incorporated herein by reference.

The substantially random α-olefin/vinyl aromatic interpolymers can also be prepared by the methods described in JP 07/278,230 employing compounds shown by the general formula

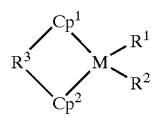

wherein $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; m is a group IV metal, preferably Zr or Hf, most preferably Zr; and $R^3$ is an alkylene group or silanediyl group used to cross-link $Cp^1$ and $Cp^2$.

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 filed Sep. 4, 1996 and WO 98/09999 both by Francis J. Timmers et al. These interpolymers contain additional signals in their carbon-13 NMR spectra with intensities greater than three times the peak to peak noise. These signals appear in the chemical shift ranges of 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-13 NMR peaks but with slightly different chemical shifts.

These interpolymers can be prepared by conducting the polymerization at temperatures of from about −30° C. to about 250° C. in the presence of such catalysts as those represented by the formula

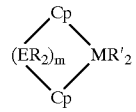

wherein: each Cp is independently, each occurrence, a substituted cyclopentadienyl group π-bound to M; E is carbon or Si; M is a group IV metal, preferably Zr or Hf, most preferably Zr: each R is independently, each occurrence, hydrogen, hydrocarbyl, silahydrocarbyl, or hydrocarbylsilyl, containing up to about 30 preferably from 1 to about 20 more preferably from 1 to about 10 carbon or silicon atoms; each $R^1$ is independently, each occurrence, hydrogen, halo, hydrocarbyl, hyrocarbyloxy, silahydrocarbyl, hydrocarbylsilyl containing up to about 30, preferably from 1 to about 20, more preferably from 1 to about 10 carbon or silicon atoms or two $R^1$ groups together can be a $C_1$–$C_{10}$ hydrocarbyl substituted 1,3-butadiene; M is 1 or 2; and optionally, but preferably in the presence of an activating cocatalyst. Particularly, suitable substituted cyclopentadienyl groups include those illustrated by the formula:

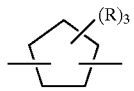

wherein each R is independently, each occurrence, hydrogen, hydrocarbyl, silahydrocarbyl, or hydrocarbylsilyl, containing up to about 30, preferably from 1 to about 20, more preferably from 1 to about 10 carbon or silicon atoms or two r groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl) zirconium dichloride, racemic-(dimethylsilanediyl)-bis-(2-methyl-4-phenylindenyl) zirconium 1,4-diphenyl-1,3-butadiene, racemic-(dimethylsilanediyl)is-(2-methyl-4-phenylindenyl) zirconium di-$C_{1-4}$, alkyl racemic-(dimethylsilanediyl)-bis-(2-methyl-4-phenylindenyl) zirconium di-$C_1$–$C_4$ alkoxide, or any combination thereof and the like.

It is also possible to use the following titanium-based constrained geometry catalysts, [N-(1,1-dimethylethyl)-1,1-dimethyl-1-[(1,2,3,4,5-η)-1,5,6,7-tetrahydro-s-indacen-1-yl]silanaminato(2-)-N]titanium dimethyl; (1-indenyl)(tert-butylamido)dimethyl-silane titanium dimethyl; ((3-tert-butyl)(1,2,3,4,5-η)-1-indenyl)(tert-butylamido) dimethylsilane titanium dimethyl; and ((3-iso-propyl)(1,2,3,4,5-η)-1-indenyl)(tert-butyl amido)dimethylsilane titanium dimethyl, or any combination thereof and the like.

Further preparative methods for the interpolymers used in the present invention have been described in the literature. Longo and Grassi (Makromol. Chem., Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyltitanium trichloride (CpTiCl₃) to prepare an ethylene-styrene copolymer. Xu and Lin (Polymer Preprints, Am. Chem. Soc., Div. Polym. Chem., Vol. 35, pages 686–687 [1994]) have reported copolymerization using a MgCl₂/TiCl₄/NdCl₃/Al (iBu)₃ catalyst to give random copolymers of styrene and propylene. Lu et al. (Journal of Applied Polymer Science, Vol. 53, pp. 1453 to 1460, 1994) have described the copolymerization of ethylene and styrene using a TiCl₄/NdCl₃/MgCl₂/Al(Et)₃ catalyst. Semetz and Mulhaupt, (Macromol. Chem. Phys., Vol. 197, pp. 1071–1083, 1997) have described the influence of polymerization conditions on the copolymerization of styrene with ethylene using Me₂Si(Me₄Cp)(n-tert-butyl)TiCl₂/methylaluminoxane Ziegler-Natta catalysts. Copolymers of ethylene and styrene produced by bridged metallocene catalysts have been described by Arai, Toshiaki and Suzuki (Polymer Preprints, Am. Chem. Soc., Div. Polym. Chem., Volume 38, pages 349–350, 1997; U.S. Pat. No. 5,883,213 and DE-A-197 11 339) and in U.S. Pat. No. 5,652,315, issued to Mitsui Toatsu Chemicals, Inc. The manufacture of α-olefin/vinyl aromatic monomer interpolymers such as propylene/styrene and butene/styrene is as described in U.S. Pat. No. 5,244,996, issued to Mitsui Petrochemical Industries Ltd. or U.S. Pat. No. 5,652,315 also issued to Mitsui Petrochemical Industries Ltd, or as disclosed in DE-A-1 97 11 339 to Denki Kagaku Kogyo KK. All the above methods disclosed for preparing the interpolymer component are incorporated herein by reference. Also, although of high isotacticity and therefore not "substantially random", the random copolymers of ethylene and styrene as disclosed in Polymer Preprints Vol. 39, No. 1, March 1998 by Toru Aria et al. can also be employed for the purposes of the present invention.

While preparing the substantially random interpolymer, an amount of atactic vinyl aromatic homopolymer may be formed due to homopolymerization of the vinyl aromatic monomer at elevated temperatures. The presence of vinyl aromatic homopolymer is in general not detrimental for the purposes of the present invention and can be tolerated.

The substantially random interpolymer usually contains from about 5 to about 65, preferably from about 5 to about 55, more preferably from about 10 to about 50 mole percent of at least one vinyl or vinylidene aromatic monomer; or sterically hindered aliphatic or cycloaliphatic vinyl or vinylidene monomer; or both; and from about 35 to about 95, preferably from about 45 to about 95, more preferably from about 50 to about 90 mole percent of ethylene and/or at least one aliphatic α-olefin having from about 3 to about 20 carbon atoms.

The most preferred substantially random interpolymers are interpolymers of ethylene and styrene and interpolymers of ethylene, styrene and at least one alpha-olefin containing from 3 to 8 carbon atoms.

The presence of other polymerizable ethylenically unsaturated monomer(s) is optional.

The density of the substantially random interpolymer is generally about 0.930 g/cm³ or more, preferably from about 0.930 to about 1.045 g/cm³, more preferably from about 0.930 to about 1.040 g/cm³, most preferably from about 0.930 to about 1.030 g/cm³. The molecular weight distribution, $M_w/M_n$ is generally from about 1.5 to about 20, preferably from about 1.8 to about 10, more preferably from about 2 to about 5.

Thermoplastic polymers useful in the present invention also include alkenyl aromatic polymers. The alkenyl aromatic polymers may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 weight percent and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include homopolymers and copolymers derived from alkenyl aromatic compounds such as styrene, alpha-methylstyrene, ethylstyrene, vinyl benzene, vinyl toluene, chlorostyrene, and bromostyrene, t-butyl styrene, including all isomers of these compounds. Suitable polymers also include alkenyl aromatic polymers having a high degree of syndiotactic configuration. A preferred alkenyl aromatic polymer is polystyrene. Minor amounts of monoethylenically unsaturated compounds such as $C_2$–$C_6$ alkyl acids and esters, ionomeric derivatives, and $C_4$–$C_6$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

General purpose polystyrene is the most preferred alkenyl aromatic polymer material. The term "general purpose polystyrene" is defined in the Encyclopedia of Polymer Science and Engineering, Vol. 16, pp. 62–71, 1989. Such polystyrene is often called also referred to as crystal polystyrene or polystyrene homopolymer.

The monoalkenyl aromatic polymers may be suitably modified by rubbers to improve their impact properties. Examples of suitable rubbers are homopolymers of $C_4$–$C_6$ conjugated dienes, especially butadiene or isoprene; interpolymers of one or more alkenyl aromatic monomers, and one or more $C_4$–$C_6$ conjugated dienes, interpolymers of ethylene and propylene or ethylene, propylene and a non-conjugated diene, especially 1,6-hexadiene or ethylidene norbornene; homopolymers of $C_4$–$C_6$ alkyl acrylates; interpolymers of $C_4$–$C_6$ alkyl acrylates and an interpolymerizable comonomer, especially an alkenyl aromatic monomer or a $C_1$–$C_4$ alkyl methacrylate. Also included are graft polymers of the foregoing rubbery polymers wherein the graft polymer is an alkenyl aromatic polymer. A preferred alkenyl aromatic polymer for use in all of the foregoing rubbery polymers is styrene. A most preferred rubbery polymer is polybutadiene or a styrene/butadiene copolymer.

Impact modified alkenyl aromatic polymers are well known in the art and commercially available.

Suitable polymers to be employed as Component (A) also include alkenyl aromatic polymers having a high degree of syndiotactic configuration.

Preferred alkenyl aromatic polymers include polystyrene, syndiotactic polystyrene, rubber-modified high impact polystyrene, poly (vinyl-toluene), and poly(alpha-methylstyrene).

Thermoplastic polymers for use in the present invention also include melt-stable lactide polymers or poly(lactide). By "melt-stable" it is meant that the lactide polymer when subjected to melt-processing techniques adequately maintains its physical properties and does not generate byproducts in sufficient quantity to foul or coat processing equipment. Lactide polymers are obtainable from lactic acid and may therefore also be referred to as PLA resins. Such lactide polymers are disclosed, for example, in U.S. Pat. No. 5,773,562, the disclosure of which is incorporated herein by reference in its entirety. Suitable PLA resins are supplied commercially by Cargill Dow under the designation Eco-PLA. Poly(lactide) offers the benefits of being a renewable resource material which may be obtained from corn and of being biodegradable (compostable). Thus, poly(lactide) may be disposed of in an environmentally sound fashion.

The poly(lactide) formulation may include a plasticizer. Suitable plasticizers and selection criteria are disclosed in U.S. Pat. No. 5,773,562 (column 14, line 35–column 15, line 28).

To improve certain properties of poly(lactide) it may be advantageous to blend a second polymer with the poly (lactide). Suitable 'second polymers' and selection criteria are disclosed in U.S. Pat. No. 5,773,562 (column 7, lines 21–47).

Suitable elastomers and block polymers include, for example, block copolymers such as styrene/butadiene (SB) block copolymers, styrene/ethylene-butene/styrene (SEBS) block polymers, styrene/ethylene-propylene/styrene (SEPS) block polymers, styrene/isoprene/styrene (SIS) block polymers, and styrene/butadiene/styrene (SBS) block polymers; polyester/polyether block polymers (e.g., HYTEL™); ethylene/propylene rubbers; and ethylene/propylene/diene (EPDM) elastomers. Preferred elastomers are vinyl aromatic/conjugated diene block polymers (e.g. SBS) that have been substantially hydrogenated; that is the block copolymer is characterized by each hydrogenated vinyl aromatic polymer block having a hydrogenation level of greater than 90 percent and each hydrogenated conjugated diene polymer block having a hydrogenation level of greater than 95 percent where hydrogenation converts unsaturated moieties into saturated moieties. Also, preferred block polymers have a higher ratio of rigid polymer blocks (e.g. vinyl aromatic polymer blocks) to rubber polymer blocks (e.g. conjugated diene polymer blocks).

Suitable thermoplastic phenoxy resins include polyhydroxyaminoether, polyhydroxyesterether or polyhydroxyether.

The polymers used in the present invention may be modified, for example, but not limited to, by typical grafting, hydrogenation, functionalizing, or other reactions well known to those skilled in the art.

The graft modification of polymers, particularly polyolefins, such as polyethylenes and polypropylenes, with various unsaturated mononomers is well known in the art. Such a modification renders an essentially nonpolar material compatible, at least to some limited extent, with a polar material. Graft modification of the polymers is advantageously accomplished by employing an organic compound containing at least one ethylenic unsaturation (e.g., at least one double bond), and at least one carbonyl group (–C=O). Representative of compounds that contain at least one carbonyl group are the carboxylic acids, anhydrides, esters and their salts, both metallic and nonmetallic. Preferably, the organic compound contains ethylenic unsaturation cponjugated with a carbonyl group. Representative compounds include maleic, fumaric, acrylic, methacrylic, itatonic, crotonic, methyl crotonic and cinnamic acid and their anhydride, ester and salt derivatives, if any. Maleic anhydride is the preferred unsaturated organic compound containing at least one ethylenic unsaturation and at least one carbonyl group.

The unsaturated organic compound content of the grafted polymer is at least about 0.01 weight percent, and preferably at least about 0.05 weight percent, based on the combined weight of the polymer and the organic compound. The maximum amount of unsaturated organic compound content can vary to convenience, but typically it does not exceed about 10 weight percent, preferably it does not exceed about 5 weight percent, and more preferably it does not exceed about 2 weight percent. The unsaturated organic compound can be grafted to the polymer by any known technique. The graft-modified polymer may be blended with one or more other polymers, either grafted or ungrafted. For example, a graft modified ethylene-based or propylene-based polymer may be blended with one or more other polyolefins, either grafted or ungrafted, or with one or more polymers other than a polyolefin, either grafted or ungrafted.

The polymers may be sulfonated or chlorinated to provide functionalized derivatives according to established techniques. In addition or alternatively, the polymers may be modified by suitable chain-extending or cross-linking processes using e.g. a physical or a chemical method, including, but not limited to, peroxide-, silane-, sulfur-, radiation-, or azide-based cure systems. A more detailed description of the various cross-linking technologies is described in U.S. Pat. No. 5,869,591 and EP-A-778,852, the entire contents of both of which are herein incorporated by reference. Dual cure systems, which use a combination of heat, moisture cure and radiation steps, may be effectively employed. Dual cure systems are disclosed, for example, in EP-A-0 852 596, incorporated herein by reference. For instance, it may be desirable to employ peroxide crosslinking agents in conjunction with radiation, and sulfur-containing crosslinking agents in conjunction with silane crosslinking agents.

The present invention also provides a film, sheet, or coating, wherein the film, sheet, or coating, the thermoplastic polymeric material or both have been cured, irradiated, or crosslinked. Preferably, the cured, irradiated or crosslinked thermoplastic polymer is a polyolefin, more preferably a polyolefin as defined above, and most preferably an ethylene-based polymer. As used herein, "crosslinking" and "crosslinked" include partially crosslinking (crosslinked) as well as fully crosslinking (crosslinked), as long as the crosslinking results in a gel which is verifiable via ASTM D2765, Procedure A. The various cross-linking agents can be used alone, or in combination with one another.

Suitable heat-activated cross-linking agents include free radical initiators, preferably organic peroxides, more preferably those with one hour half lives at temperatures greater than 120° C. For example, suitable cross-linking agents are organic peroxides, such as 1,1-di-t-butyl peroxy-3,3,5-trimethylcyclohexane, dicumyl peroxide, 2,5-dimethyl-2,5-di(t-butyl peroxy) hexane, t-butyl-cumyl peroxide, α, α'-di (butyl peroxy)-diisopropyl benzene,di-t-butyl peroxide, and 2,5-dimethyl-2,5-di-(t-butyl peroxy) hexyne. Dicumyl peroxide is the preferred agent. Additional teachings to organic peroxide cross-linking agents are seen in C. P. Park, Supra, pp. 198–204, which is Incorporated herein by reference.

Alternatively, polymers may be crosslinked or cured by first grafting a silane onto the polymer backbone and thereafter subjecting or exposing the silane grafted polymer to water or atmospheric moisture. Preferably, the silane grafted polymer is subjected to or exposed to water or atmospheric moisture after a shaping or fabrication operation.

Suitable silanes for silane crosslinking of the polymer, e.g. the ethylene polymer, include those of the general formula

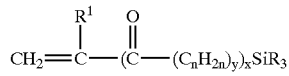

in which R$^1$ is a hydrogen atom or methyl group; x and y are 0 or 1 with the proviso that when x is 1, y is 1; n is an integer from 1 to 12 inclusive, preferably 1 to 4, and each R independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R groups is an alkyl.

Suitable silanes may be grafted to a suitable (ethylene) polymer by the use of a suitable quantity of organic peroxide, either before or during a shaping or fabrication operation. However, preferably, the silane is grafted onto the polymer before shaping or fabrication operations. In any case, the curing or crosslinking reaction takes place following the shaping or fabrication operation by reaction between the grafted silane groups and water. The water permeating into the bulk polymer from the atmosphere or from a water bath or "sauna". The phase of the process during which the crosslinks are created is commonly referred to as the "cure phase" and the process itself is commonly referred to as "curing".

Any silane that will effectively graft to and crosslink the polymer can be used in the present invention. Suitable silanes include unsaturated silanes that comprise an ethylenically unsaturated hydrocarbyl group, such as a vinyl, allyl, isopropenyl, butenyl, cyclohexenyl or γ-(meth) acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627 to Meverden, et al. Vinyl trimethoxy silane, vinyl triethoxy silane, γ-(meth) acryloxy propyl trimethoxy silane and mixtures of these silanes are the preferred silane crosslinkers for use in this invention. It a filler is present, then preferably the crosslinker includes vinyl triethoxy silane.

The amount of silane crosslinker used in the present invention can vary widely depending several factors such as the silane itself, processing conditions, grafting efficiency, organic peroxide selection, the ultimate application, and similar factors.

However, typically at least 0.5, preferably at least 0.7, parts per hundred resin (phr) is used. Considerations of convenience and economy are usually the two principal limitations on the maximum amount of silane crosslinker used, and typically the maximum amount of silane crosslinker does not exceed 5, preferably it does not exceed 2, phr.

The silane crosslinker is grafted to the polymer by any conventional method, typically in the presence of a free radical initiator e.g. peroxides and azo compounds, or by ionizing radiation, etc. A suitable grafting method is disclosed in WO 95/29197, the disclosure of which is incorporated herein by reference.

But, for efficient silane grafting, organic initiators are preferred, such as an azo compound or any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di-(t-butyl peroxy) hexane, lauryl peroxide, and tert-butyl peracetate. A suitable azo compound is azobisisobutyl nitrite. The amount of initiator can vary, but it is typically present in an amount of at least 0.04, preferably at least 0.06, phr. Typically, the initiator does not exceed 0.15, preferably it does not exceed about 0.10, phr. The ratio of silane crosslinker to initiator also can vary widely, but the typical crosslinker to initiator ratio is between 10 to 1 to 30 to 1, preferably between 18 to 1 and 24 to 1.

While any conventional method can be used to graft the silane crosslinker to the polymer, one preferred method is blending the two with the initiator in the first stage of a reactor extruder, such as a Buss kneader. The grafting conditions can vary, but the melt temperatures are typically between 160° C. and 260° C., preferably between 190° C. and 230° C., depending upon the residence time and the half life of the initiator.

Also suitable for the purpose of the present invention are moisture cure silane copolymers, such as ethylene-vinyl silane copolymers and ethylene vinyl acetate-vinyl silane polymers.

Crosslinking by irradiation may be accomplished by the use of high energy, ionizing electrons (electron beam), ultra violet rays, X-rays, gamma rays, beta particles, controlled thermal heating, or any combination thereof. Electron beam irradiation is preferred. Advantageously, electrons are employed up to 70 megarads dosages. The irradiation source can be any apparati known in the art such as an electron beam generator operating in a range of about 50 kilovolts to about 12 megavolts with a power output capable of supplying the desired dosage. The voltage of the electron beam generator can be adjusted to appropriate levels which may be, for example, 100,000, 300,000, 1,000,000 or 2,000,000 or 3,000,000 or 6,000,000 or higher or lower. In electron beam irradiation, the irradiation is usually carried out at a dosage between about 1 megarads to about 150 megarads, preferably between about 3 to about 50 megarads. Further, electron beam irradiation can be carried out conveniently at room temperature, although higher and lower temperatures, for example 0° C. to about 60° C., may also be employed. Furthermore, electron beam irradiation can be carried out in air atmosphere, or in reduced oxygen atmosphere or in inert gas atmosphere. Preferably, electron beam irradiation is carried out after shaping or fabrication of the article.

Also, in a preferred embodiment, a polyolefin is incorporated with a pro-rad additive and is subsequently irradiated with electron beam irradiation at about 8 to about 20 megarads. Suitable pro-rad additives are compounds which are not activated during normal fabrication or processing of the polymer, but are activated by the application of temperatures (heat) substantial above normal fabrication or processing temperatures or ionizing energy (or both) to effectuate some measurable gelation or preferably, substantial crosslinking.

Representative pro-rad additives include, but are not limited to, azo compounds, organic peroxides and polyfunctional vinyl or allyl compounds such as, for example, triallyl cyanurate, triallyl isocyanurate, pentaerthritol tetramethacrylate, glutaraldehyde, ethylene glycol dimethacrylate, dially maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobisisobutyl nitrite and the like and combination thereof. Preferred pro-rad additives for use in the present invention are compounds which have poly-functional (i.e. at least two) moieties such as C=C, C=N or C=O.

At least one pro-rad additive can be introduced to the polymer by any method known in the art. But, preferably the pro-rad additive(s) is introduced via a masterbatch concentrate comprising the same or different base resin as the polymer. Preferably, the pro-rad additive concentration for the masterbatch is relatively high e.g., about 25 weight percent (based on the total weight of the concentrate).

Pro-rad additives are introduced to the polyolefin in any effective amount. Preferably, the at least one pro-rad additive introduction amount is from about 0.001 to about 5 weight percent, more preferably from about 0.005 to about 2.5 weight percent and most preferably from about 0.015 to about 1 weight percent based on the total weight of the polymer. Crosslinking can also be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 phr.

The film, sheet, or coating of the invention may also comprise suitable mixtures, such as blends, of thermoplastic polymers. Polymer mixtures or compositions can be formed by any convenient method. If desired or required, compatibilization between two immiscible or incompatible polymers can be effected by a suitable compatibilizer. Preparing the compositions by physical admixture includes dry blending, melt blending and solution blending, that is dissolving one or both of the components in a suitable solvent, such as for example a hydrocarbon, and combining the components followed by removing the solvent or solvents. Dry blending involves blending the individual components in solid particulate and subsequently melt mixing in a mixer or by mixing the components together directly in a mixer (for example, a Banbury mixer, a Haake mixer, a Brabender internal mixer, or a single or twin screw extruder including a compounding extruder and a side-arm extruder employed directly downstream of a interpolymerization process.

The mixtures can further be formed in-situ. For example, blends comprising a substantially linear ethylene interpolymer may be formed via interpolymerization of ethylene and the desired α-olefin using a constrained geometry catalyst in at least one reactor and a constrained geometry catalyst or a Ziegler-type catalyst in at least one other reactor. The reactors can be operated sequentially or in parallel. An exemplary in-situ interpolymerization process is disclosed in International Application WO 94/01052, incorporated herein by reference. The blends may be prepared using two reactors operated in series or in parallel, or by in-reactor blending using two or more catalysts in a single reactor or combinations of multiple catalysts and multiple reactors. The general principle of making polymer blends by in-reactor blending using two or more catalysts in a single reactor or combinations of multiple catalysts and multiple reactors is described in WO 93/13143, EP-A-0 619 827, and U.S. Pat. No. 3,914,362, each of which are incorporated herein by reference. The present polyolefin compositions can be prepared by selecting appropriate catalyst and process conditions with a view to the final composition characteristics.

Thermoplastic polymers suitable for use in the present invention also include recycled and scrap materials and diluent polymers (both encompassed by the expression "diluent materials"), to the extent that the desired performance properties are maintained. Exemplary diluent materials include, for example, elastomers, rubbers and anhydride modified polyethylenes (for example, polybutylene and maleic anhydride grafted LLDPE and HDPE) as well as high pressure polyethylenes such as, for example, low density polyethylene (LDPE), EAA interpolymers, ethylene/vinyl acetate (EVA) interpolymers and ethylene/methacrylate (EMA) interpolymers, and combinations thereof. In some instances, it is preferable for a polymer mixture to contain less than 50 weight percent, more preferably less than 30 weight percent diluent material, particularly when the diluent material is a styrene copolymer, a styrene/butadiene rubber or a styrene/butadiene/styrene block copolymer (SBS).

Additives

Optionally, the film, sheet, or coating of the present invention may further comprise additives, including, but not limited to, antioxidants (e.g., hindered phenolics, such as IRGANOX™ 1010 or IRGANOX™ 1076 supplied by Ciba Specialty Chemicals), phosphites (e.g., IRGAFOS™ 168 also supplied by Ciba Specialty Chemicals), cling additives (e.g., polyisobutylene (PIB), SANDOSTAB PEPQ™ (supplied e.g. by Ciba Specialty Chemicals), pigments, colorants, deodorants, fillers, plasticizers, medical ornaments such as diaper rash ornaments, UV stabilizers, heat stabilizers, processing aid and combinations thereof.

Although generally not required, the film, sheet, or coating of the present invention may also contain additives to enhance antiblocking (antiblock agents) coefficient of friction characteristics (slip agents) including, but not limited to, untreated and treated silicon dioxide, talc, calcium carbonate, and clay, as well as primary, secondary and substituted fatty acid amides, and combinations thereof.

Still other additives, such as quaternary ammonium compounds alone or in combination with ethylene-acrylic acid (EAA) copolymers or other functional polymers, may also be added to enhance the anti-static characteristics of the film, sheet, or coating of the invention. Enhanced anti-static characteristics promote the usefulness of the inventive film, sheet, or coating in, for example, cushioned packaging of electronically sensitive goods.

Films, Sheets, Coatings

The films, sheeting, or coatings of the present invention are characterized in that they comprise at least one layer, which has a 'fringed' surface microstructure. In this document, a film, sheet, or coating, or a layer thereof having such fringed surface microstructure is also referred to as "fringed film, sheet, coating or layer", including each item individually, e.g. "fringed film". The fringed surface microstructure may cover a desired part or parts, or substantially the entire fringed item, depending on the intended use of said item. When magnified, the side view of a fringed surface microstructure shows a broken up base consisting of a pattern of peaks or protrusions separated by troughs or valleys. In top or cross-sectional view, the peaks have a crown-like or crater-like appearance and are at least partially hollow at the top, meaning that at least about 25 percent of the volume at the top of the peak are empty or unfilled. "At least partially hollow" includes completely hollow peaks. Such at least partially hollow peaks or so-called craters are referred to as 'fringes'. The base (of the fringe layer) and the fringes (themselves) are composed of the same thermoplastic polymeric material. The fringes are integral components of the layer forming the fringed surface microstructure. The peaks are generally non-perforated, meaning that the base at the bottom of the craters is generally not perforated.

The fringes may have various three-dimensional structures. For example, they may approximate tubular or conical shapes. Various parameters can be used to characterize the geometry of the fringes, such as the relation between different diameters. For example, the diameter at the bottom of the fringe may be larger, about the same, or smaller than the diameter at the tip of the fringe. Exemplary three-dimensional fringe structures mimic bottle-like or wine glass-like shapes. The side walls of the fringe typically become thinner towards the top of the crater. The brim at the top of the peak or crater may be (relatively) smooth, wave-like or fuzzy. The opening may be round or elliptical.

If the fringed microstructure of the film, sheet, or coating is not discernible with the naked eye, it is microscopically discernible, for example at an enlargement of about 10 times or more. For example; when appropriately magnified using Scanning Electron Microscopy (SEM), the top view of the fringed surface microstructure exhibits a pattern of craters, for example a pattern of tubes or cylinders, which emerge from the base. The cross-sectional view, cutting through the center of the craters, exhibits peaks for the walls of the craters, followed by valleys which represent the crater holes as well as the surface of the base which is between the craters as dictated by the pattern of the base.

The fringed surface microstructure can be characterized by one or more quantitative parameters relating to the dimensions of the (overall) fringe, its (inner) hollow part, or both. Suitable parameters include fringe density, length or height (ratios), diameters, hollowness index or enhanced surface area, taken alone or in any combination. The fringed film, sheet or coating of the invention may be designed to comprise substantially similar or different fringe structures.

Methods to determine the dimensional fringe parameters are known in the art, such as microscopy or optical surface profilometry.

In brief, suitable samples, such as cross-sections, of a fringed film, sheet, or coating may be analyzed by optical or electron microscopy using microtoming. Several cross-sections, for example 20 to 40, should be obtained such that the hollow center of a crater can be identified. For example, cross-sections from items with relatively short fringes, e.g. with lengths below about 75 microns, are advantageously cut using an ultra-sharp, durable tool, such as a diamond knife, at very low temperatures, e.g. at $-120°$ C. (minus 120 degrees Celsius). Cross-sections of items with longer fringes are embedded in a medium suitable for embedding tissue, such as Paraplast™ wax.

Optical surface profilometry is a method capable of profiling a rough surface having height variations. The method is performed with a non-contact optical profiler using vertical scanning interferometry (VSI) technology. Such profilers are commercially available, e.g. from ADE Phase Shift, or VEECO Methology Group, both in Tucson, Ariz., USA. Details on the method and the device are disclosed in an article by P. J. Caber et al., "New interferometric Profiler for Smooth and Rough Surfaces", Proc. SPIE, page 2088, October 1993, and U.S. Pat. No. 5,133,601; 5,204,734 or 5,355,211, all by D. K. Cohen and C .P. Brophy and incorporated herein by reference. Vertical scanning interferometry is characterized in that the interferometric objective moves vertically to scan the surface at varying heights. The source light beam is split within the interferometer. The beams reflected from the test surface and the reference surface recombine to form interference fringes. These interference fringes are the alternating light and dark bands which appear when the surface is in focus. The contrast of these interference fringes(or modulation) increases as the sample is translated into focus, then falls as it is translated past focus. As the system scans downward, an interference signal for each point on the surface is recorded. The interference fringe signal is then processed (demodulated) using a series of digital processing algorithms to calculate surface heights. From these heights and corresponding positions, a three-dimensional profile height function as well as two-dimensional cross-sectional views can be generated. The dimensional parameters used for fringe characterization are derivable from these structural data.

For the purpose of this invention, optical, non-contact profilometry is used to characterize the fringe structure and determine the dimensional parameters. This method has the advantage of being a non-destructive method, which does not require time-consuming sample preparation. The range of the surface height that can be profiled using this technique was 0.1 nm to 1 mm standard with less than 1% error. The method provides two-dimensional as well as three-dimensional structural data enabling the determination of several parameters with one measurement. The method utilizes a white light source. If a fringed surface microstructure is composed of fringes with a structure which is unsuitable to be measured by profilometry, the dimensional parameters are measured via optical microscopy.

The optical profilometry measurement can generate directly a number of surface microstructure data, such as the surface area ratio, the arithmetic average roughness, the average maximum peak-to-valley value and the average spacing of roughness peaks. The surface area is the total of the exposed three-dimensional surface area being analyzed, including peaks and valleys. The lateral surface area is the surface area measured in the lateral direction. The surface area ratio is calculated as the ratio of the surface area divided by the lateral surface area. The arithmetic average roughness, designated as Ra in surface metrology, is the arithmetic mean height relative to the reference mean plane. The reference mean plane is the three-dimensional reference surface to which all points in the dataset are related. The Ra value is calculated as:

$$Ra = \frac{1}{MN} \sum_{j=1}^{M} \sum_{i=1}^{N} |Z_{ji}|$$

For the purpose of the present invention, the Ra values relate to the total volume of fringes when the base of the film is selected as the reference mean plane.

The average maximum peak-to-valley value is the average maximum peak-to-valley height over the evaluation area, which is calculated as the average of each maximum peak-to-valley height of the measured data array. The average maximum peak-to-valley height Rz, is calculated as $$Rz = \frac{1}{N} \sum_{i=1}^{N} (Hi - Li),$$

wherein Hi are the highest points and Li are the lowest points found in the data array, and N is the number of data arrays within the dataset (evaluation area). The peak-to-valley value is the height difference between adjacent peaks and valleys. For the purpose of the present invention, the average maximum peak-to-valley height corresponds to the fringe length or height (H).

The density of individual fringes is at least about 1000 per square centimeter ($cm^2$), preferably at least about 2000/$cm^2$. Preferably, the density is less than 10,000 per square centimeter. Most preferably, the density is In the range of from about 2000 to about 5000 fringes per $cm^2$. If desired, the fringe density may be selected to vary within the fringed surface microstructure.

Fringe density can be determined by optical or electron microscopy, and surface profilometry.

FIG. 1 shows a cross-sectional view of an exemplary tubular fringe (2) which is integral with the layer forming the fringes (1). (3) indicates the (total) length of a fringe (H), (4) indicates the depth of the hollow center or inner height ($H_n$), (5) is the diameter at the bottom of the fringe (D), and (6) is the (inner) diameter of the hollow center ($D_{1/2}$) at half height ($H_n/2$) (7).

As used herein, the fringe length or height (H) is the average maximum (vertical) distance between a (base) valley adjacent to the fringe whose height is determined and the tip of said fringe. It is readily apparent that the height should be determined on fringes in their most possible upright or vertical position, rather than on bent over or down-lying fringes. A particular fringe may be higher on one side. The fringes should have a minimum height of at least about 40 micrometers (microns) or more, preferably of at least about 80 microns or more, most preferably of at least about 150 microns or more. Typically, the fringe height is less than about 1 millimeter, preferably less than 600 microns. Most preferably, the fringe height is in the range of from about 200 to about 400 microns.

The particular geometry of the fringes can further be characterized in terms of the depth or height and diameter of the inner hollow part. These parameters can be put in relation with the overall fringe dimensions.

The values for $H_n$, D and $D_{1/2}$ can be calculated from the profile height function as determined by optical surface profilometry. These structural parameters can also be measured from the two-dimensional cross-sectional view of the fringe structure when the cross-section is dissecting the center of the hollow fringes as schematically illustrated in FIG. 1.

The hollow depth ratio (●) is defined as the ratio of the average inner height or average depth of the hollow center ($H_n$) to the average (maximum) height of the fringe (H) (●=$H_n$/H). The depth of the hollow center ($H_n$) may exceed the (outer) height (H) of the fringe, yielding a hollow depth ratio (●) of more than 1. Preferable, ● is below 1.3, more preferably below 1.2.

The hollow diameter ratio (●) is defined as the ratio of the diameter of the hollow center at half (inner) height ($D_{1/2}$) and the diameter at the bottom of the fringe (D) (●=$D_{1/2}$/D). The diameter at the bottom of the fringe (D) is determined at the point of inflection at which the vertical portion of the fringe starts. While the ratio may be higher than 1, fringe structures with values of about 1 or lower are preferred. At least partially hollow craters characteristic of the fringed surface microstructure of the present invention preferably have a hollow diameter ratio of at least about 0.1 or higher. In case the hollow diameter ratio is higher than 1, the measurements should be determined by optical microscopy.

The hollow depth ratio (●) and the hollow diameter ratio (●) are used to calculate the Hollowness Index (●). The Hollowness Index is indicative of the degree of hollowness, or the unfilled volume at the top of the fringe. The Hollowness Index (●) is calculated by multiplying the hollow depth ratio (●) with the hollow diameter ratio (●) (●=●×●× 100=$H_n$/H×$D_{1/2}$/D×100). The Hollowness Index (●) is typically about 15 or higher, preferably about 25 or higher, more preferably 40 percent or higher. The Hollowness Index may be more than 100 (e.g., in case (●) is higher than 1). The Hollowness Index should be below 260, preferably below 130 preferably, more preferably the Index is 100 or lower, most preferably about 90 or lower. For the purpose of the present invention, fringes having a Hollowness Index of 100 or higher are considered as being completely hollow.

Another parameter suitable to characterize the fringe structure is the total surface area which depends on the fringe height (H), the hollowness, the diameters (D and $D_{1/2}$) and the density of the fringes. The Surface Area Ratio can be obtained by optical surface profilometry. Generally and as evident from FIG. 1, an at least partially hollow fringe according to the present invention has a greater surface area than a corresponding solid fringe (having the same outside geometric dimension).

Another parameter useful to characterize the fringe structure is the aspect ratio (A). The aspect ratio (A) is the ratio of the fringe height (H) and the fringe diameter (D) (A=H/D). Preferably, the fringes have an aspect ratio of between about 1 and about 5, most preferably between about 1 and 3.

Another parameter characterizing the fringed surface microstructure is the center-to-center distance between two adjacent fringes. Preferably, the center-to-center distance is from about 100 to about 300 microns.

The particular three-dimensional fringed surface configuration characterizing at least one layer of the film, sheet, or coating according to the present invention may be obtained starting from a suitable precursor film, sheet, or coating. The structure of said precursor is characterized by a distinct surface texture consisting in a pattern of different (surface) thicknesses, i.e. areas of reduced thickness (valleys or troughs) and areas of greater thickness (peaks or protrusions). Advantageously, this pattern is predetermined and may be irregular or regular.

Alternatively, the precursor may be a foamed structure, e.g. a film, sheet, or coating having a foamed surface layer. In such case, the precursor protrusions are formed by the microbubbles of the foam. In the following, a film, sheet, or coating characterized by such pattern of different surface thicknesses and suitable to give a fringed surface microstructure according to the present Invention will be referred to as "precursor" (film, sheet, or coating). This includes a film, sheet, or coating which in part is characterized by such pattern of different surface thicknesses.

To obtain the fringed surface microstructure the precursor surface is mechanically treated such that the protrusions are essentially longitudinally extended. Preferably, such longitudinal extension or stretching of the precursor protrusions is the result of treatment using mechanical means, such as a mechanical pulling force and/or an abrasive device.

The mechanical treatment of the precursor film, sheet, or coating is preferably performed in an in-line process, meaning that formation of the precursor structure and the fringed surface microstructure occur in a single continuous process. Such in-line process involves a matrix surface suitable to create a surface texture and comprises formation of the precursor film, sheet, or coating on the matrix surface in a continuous compression molding process and subsequent formation of the fringed surface microstructure when the film, sheet or coating is pulled off the matrix surface under certain conditions.

The matrix surface, for example a moving belt or a roller surface, presents a negative or reverse approximation with respect to the desired surface texture of the precursor such that the thermoplastic material closely contacts said reverse structure under pressure. The negative structure may, for example, consist of very fine cavities. The cavities may have various geometries—primary variables include cavity dimensions (diameter, depth), shape and entry angle (with respect to the matrix surface). Advantageously, the surface temperature of the moving belt or roller is adjustable.

In such a continuous process, mechanical treatment resulting in the longitudinal extension of the precursor protrusion occurs during the removal or peel-off of the precursor film, sheet, or coating from the matrix surface by exerting on the protrusions a tractive force at a certain angle. Appropriate control and defined conditions for the mechanical treatment are essential to make a fringed surface microstructure according to the present invention.

Mechanical post-treatment of the thus obtained fringed film, sheet, or coating, for example with an abrasive material, is optional, but may be desired to enhance fringed surface characteristics and properties. The additional mechanical deformation by means of an abrading device should affect, for example, the fringe length and/or the texture of the fringe tips.

Suitable equipment for such continuous compression molding process to make a fringed film, sheet, or coating comprises a set of surfaces, as presented for example by a pair of rollers, preferentially enabling temperature control, with defined surface qualities. The surfaces may have different, similar or equal surface roughness and shape. The surfaces may be part of the primary equipment used to make the (base) film, sheet, or coating, or, preferably, be installed for a secondary (separate) compression molding process. At least one surface, referred to as matrix surface, is characterized by the presence of numerous cavities with a projected area of at least about 1000 square microns and a depth of at least about 100 microns. The number or density of cavities should correspond to the desired fringe number or density. Such matrix surface structure can be provided by a porous material, an open cell, foamed material, by woven or entangled fibrous structures (e.g., natural, metallic, polymeric), by sintering of a suitable material, such as metallic, ceramic, polymeric or natural particles, or fibrous materials, by mechanical or chemical treatment of a suitable material, or preferably by eroding techniques (electrical, chemical, lasering). Preferably, the cavities are substantially regular or symmetrical.

Preferred matrix surfaces are steel, a rubber, e.g. covering an appropriate support, such as a steel core, a polymer, e.g. coated on an appropriate support, such as a steel, or a ceramic, e.g. on an appropriate support, such as steel. A particularly preferred matrix surface is a rubber, advantageously having a Shore A hardness in the range of about 70 to about 85, preferably a halogen-elastomer, such as a fluoroelastomer. Advantageously, the matrix surface is lasered with fine cavities having or approximating the form of cylinders.

Suitable techniques and technologies to make the matrix surface and the cavities are known in the art. The matrix surface is applied on a device suitable for processing a film, sheet, or coating, such as a roller or a belt. Typically, for symmetrical cavities, such as cylinder-like cavities, the angle of incline of the axis of symmetry of the cylinder relative to the matrix surface is in the range of from about 45 degrees to about 90 degrees, preferably 90 degrees.

To prepare the desired precursor having a pattern of different surface thicknesses a polymer mass, e.g. in the form of a polymer melt, polymer dispersion, polymer suspension, polymer solution, film, sheet, or coating is applied on the matrix surface. Advantageously and preferably, the polymer mass is applied in form of a semi-finished product, in particular in the form of a film, sheet, or coating. If desired, lamination (to that surface of the semi-finished product which is not facing the matrix surface) may be accomplished simultaneously with the continuous compression molding step. One or more counter surfaces suitable to apply pressure onto the polymer mass, such as a roller or a belt, is used to force the polymer mass into the cavities of the matrix surface. Preferably, penetration of the polymer mass into the cavities is facilitated by heating the surface of the mass to a temperature which is close to, preferably above the melting point of the polymer forming the protrusions. Generally, the person of ordinary skill in the art is readily able to select the appropriate temperature. The surface of the polymer mass is molded such that individual, distinct surface elevations or protrusions are formed in the cavities, thus yielding a suitable precursor structure. At the same time, the other surface of the polymer mass is shaped according to the structure of the counter surface of the pressuring device. The surfaces of the precursor reflect the surface characteristics of surfaces, e.g. both rolls, the pressure roll and the matrix roll. Key parameters during formation of the precursor are roll pressure and temperature (of the polymer mass surface and the relevant equipment). Low(er) viscosity of the polymer is preferred. After the surface molding, the film, sheet, or coating is released or pulled off from the matrix surface, which step requires sufficient (tensile) strength to pull the molded elevations out of the cavities. Sufficient strength is achieved by appropriately cooling the precursor, if desired using additional external cooling sources, such as an air knife or cooling water. Preferably, the thermoplastic material is not solidified, when the fringe-forming force is applied and the film, sheet or coating is stripped off the matrix surface. Most preferably, thermoplastic material is in the semi-molten state when the film, sheet or coating is stripped off the matrix roll. Advantageously, the film, sheet or coating is cooled such that the thermoplastic material forming the fringes has a temperature which is about at or advantageously below the Vicat point. If the polymer mass fed into the compression molding equipment is a suspension or emulsion (additional) drying and/or curing and/or cross-linking may be performed on the matrix roller or belt, optionally in the presence of additional sources of energy for curing or crosslinking after the surface molding has occurred.

During the release process of the precursor from the matrix surface, the protrusions characterizing the precursor surface are elongated to give the fringed surface microstructure. Thus the mechanical treatment of the precursor providing deformation of the protrusions involves subjecting the precursor and the protrusions to a tractive force. The tractive force is dependent on adhesion or interaction between the polymer comprising the fringe layer and the matrix roll surface and the release angle.

A crucial parameter in this step of mechanical treatment is the release angle, that is the angle between the fringed film, sheet, or coating during the release process and the matrix surface. In this context matrix surface means that part of the device which is free and no more covered with the film, sheet, or coating. In case the matrix surface is (on) a roller, the release angle is the angle between the fringed film, sheet, or coating and the tangent through the point of release. The release angle should be greater than 10, preferably greater than about 20 degrees, more preferably at least about 45 degrees and most preferably at least about 90 degrees. The release angle should be less than about 170 degrees. The release angle is impacted by the angle of the cavities in relation to the surface. The temperature at the polymer surface should be above the glass transition temperature and below the crystalline melting point of the polymer forming the protrusions. Release angle, take-off speed and polymer surface temperature are selected such as to further extend the protrusions of the precursor, thus still further increasing the surface area in respect to the precursor structure.

A preferred process to make the fringed film, sheet or coating of the present invention is a roller-based continuous compression molding process. Such process comprises a (cavity) filling step and a release or peel-off step, both of which affect fringe formation. In the preferred process, the matrix roll is in contact with a pre-heat or counter roll, forming a nip. The nip width depends upon the compression of either or both of the counter (or preheat) roll and the matrix roll at the temperature and pressure applied. The linear compression distance at the center (axis) of the rolls is the negative gap. The pressure in the nip can be measured according to methods known in the art. The arrangement of the rolls may be vertical or horizontal.

Figure 2:
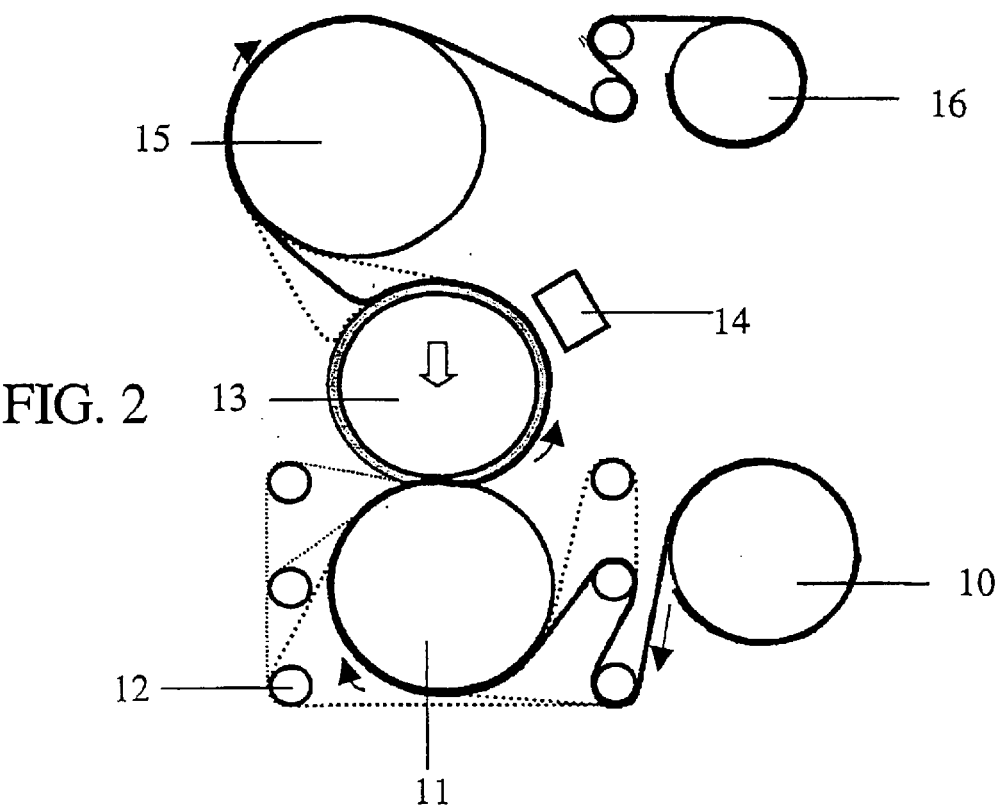
FIG. 2 shows an example of a device suitable to make a film, sheet or coating having a fringed microstructure.

FIG. 2 schematically shows an example of a calander with vertically roll arrangement) suitable to make the fringed film, sheet or coating of the invention.

So-called base film, sheet or coating is fed from a feeder roll (10) onto a pre-heat roll (11) representing the counter surface. Preferably, at least those parts of the base film, sheet or coating desired to be converted into a fringed surface microstructure have a (relatively) smooth surface. Advantageously, the temperature of the preheat roll (11) is at or above the melting point of the polymer forming the fringed surface. The base film, sheet or coating contacts the pre-heat roll (11) for a predetermined distance. If appropriate, and depending on the desired polymer temperature in the nip, the contact distance can be increased or reduced by means of one or more idler rolls (12) which set the point of initial contact on the preheat roll. The nip width depends upon the compression of either or both of the preheat roll and the matrix roll (13) at the temperature and pressure applied. The pressure in the nip can be measured according to methods known in the art.

Figure 3:
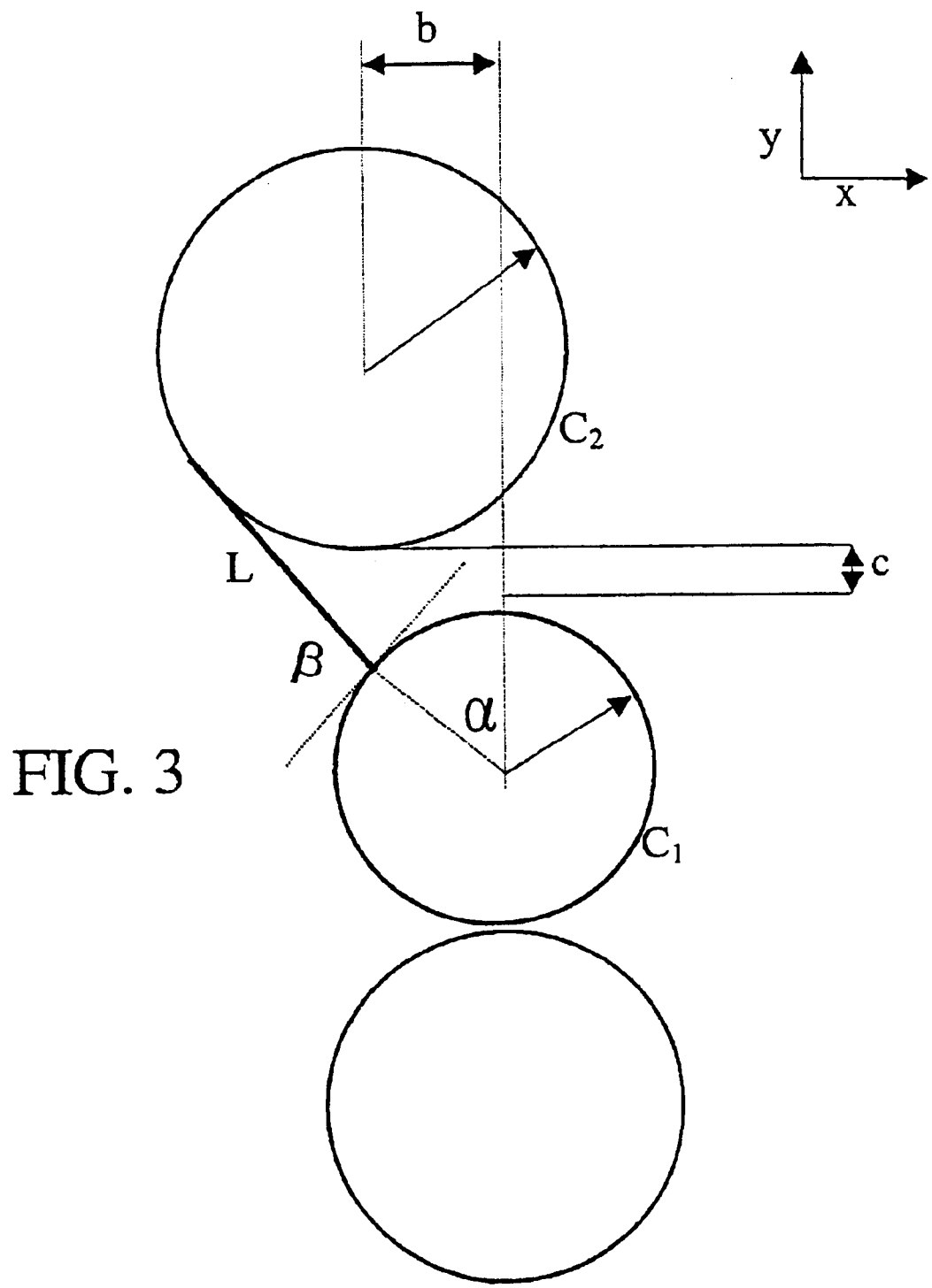
FIG. 3 illustrates a method to determine the release angle at which the film, sheet or coating is stripped from the matrix roll in a calender suitable to make the film, sheet or coating having the fringed surface microstructure.

The actual amount of preheat time that the film, sheet or coating experiences prior to the nip will be dependent upon the distance that the film wraps the preheat roll and the line speed, and any additional heat that may be supplied via auxiliary methods, such as infrared heating of the surface of the film, sheet or coating. The temperature of the particular polymer layer coming in contact with the matrix roll (13) preferably is at or above the melt temperature of the polymer when it leaves the nip contact width. For blends, the temperature should be such that the majority to all of the polymer is molten. Critical variables in the 'filling step', i.e. in the filling of the matrix cavities, which affects fringe formation include polymer type, and (its response to) line speed, temperature in the nip, and pressure in the nip. Advantageously, these variables are measured ard/or controlled using conventional methods known in the ant. For example, nip contact pressure can be measured using commercially available pressure measuring film, e.g. Fuji Prescale Film. Maximum nip pressure measured at the center of the rip width in line with the canter of the roll axis should be at least about 1 MPa, or higher. The gap between the two rolls (11) and (13) should be negative. Another critical parameter is the interaction of the polymer and the matrix roll surface. The polymer should have sufficient wettability to the matrix roll. The filling step yields the precursor which is then cooled as it travels along the matrix roll. Release from or peel-off of the matrix surface (release step) advantageously involves a take off system, for example comprising a chill roll (15) and a winder (16). Optionally, a device supporting cooling of the film, sheet or coating on the matrix roll, such as an air knife (14, may also be present. Such devices serves to facilitate real of the film from the matrix roll, or to increase production speed. The amount of force/tension required to peel the film, sheet or coating from the matrix roll for a given fringe layer polymer is dependent upon the adhesion of the polymer to the matrix tol surface (which is a function of the composition of the matrix roll surface and the polymer, and their temperatures), and the release or peel angle. FIG. 3 illustrates the determination of the peel angel (β).

The greater the adhesion, typically the higher resulting peel angle. For hollow fringe formation, it is important to optimize the adhesion, line speed and strength of the precursor so that a maximum amount of draw or elongation of the fringe layer polymer is obtained, while ensuring that the polymer is completely removed from the cavity due to an adhesive pee (or controlled adhesive failure) between the polymer and the matrix surface. This results in hollow fringe formation with optimized fringed length.

In order to avoid sticking of the film, sheet, or coating according to the invention to the equipment used in making said item or to facilitate release of the item, it may be desirable to use a sacrificial backing layer or protective layer. The sacrificial layer can be, but not limited to, oriented or non-oriented PET film, aluminum foil, non-woven/fleece, oriented or non-oriented polypropylene film, oriented or non-oriented polystyrene film, oriented or non-oriented PLA (polylactic acid) film, or natural fiber substrates, and/or a 'release aid', such as PTFE, silicon, etc. as equipment coating materials (e.g. on the pressure roll or counter roll), or plasticizer or migratory additives in the polymer matrix (fatty acids, etc.). Film or sheet exhibiting a melting point which is at least 20° C. higher than the fringed layer material are suitable as sacrificial layers.

Advantageously and preferably, the thermoplastic polymer or polymer blend forming the fringed surface microstructure is selected such that the fringes (after formation) are dimensionally stable, resilient and resistant to deformation under load at ambient temperature. Generally, polymer selection will be dictated by the particular process conditions for making the precursor and the fringed surface and the specific performance requirements of the envisaged end-use applications. Optimal filling of the cavities with the polymer is favored by employing a thermoplastic having a low viscosity at the relevant processing temperature.

Preferred polymers for use in the fringed layer obtainable by the above-described process combining optimal filling in the continuous compression molding processs and mechanical treatment by application of a tractive force are polyolefins more preferably ethylene-based polyolefins, including homogeneous ethylene-based polymers and heterogeneous ethylene-based polymers, such as Ziegler/Natta polymers having a density in the range of about 0.900 g/cm$^3$ to about 0.960 g/cm$^3$ (e.g. DOWLEX™ or ATTANE™ copolymers available from The Dow Chemical Company), or polymers produced via high pressure processes.

Optionally, the fringed film, sheet, or coating thus obtained may be subjected to mechanical post-treatment, such as treatment relying on the principle of friction, for example treatment with an abrasive device. Preferably, the abrasive device has a harder surface or surface coating than the polymer surface to be treated. Suitable abrasives include, but are not limited to, sandpaper or sand-paper type materials, brushes, steel wool, or abrasive fabrics, such as a fleece or a non-woven having the required surface hardness. Suitable materials for the brush are, for example, nylon, glass-fiber or metal wire, such as bronze. It is readily apparent to the person skilled in the art that the length of the fringes is affected by the type of abrasion material and the particular technique of treatment therewith. Critical parameters include deforming speed, applied pressure, temperature, particularly the polymer surface temperature, and hardness (difference). Advantageously, the treatment is such that the fringed surface structure is enhanced, e.g. the fringe structure is elongated and the tips may become frayed. Best results are obtained by circular, oscillating or linear movements, or any combination thereof. The general direction of these movements relative to the fringed surface and surface orientation may be longitudinal, transverse, angled, or any combination thereof. If the treatment is essentially unidirectional, it is preferred to have at least two consecutive steps of either unidirectional or angled treatment. In the case of rotational or oscillating treatment, sequential treatment steps can improve the final quality of the surface. For each combination of surface hardnesses, i.e. surface hardness of the abrasion material and surface hardness of the polymer surface, exists an optimum type of movement and speed to obtain a particular fringed surface microstructure, e.g. fringe length and Hollowness Index. Such optimization is within routine experimentation. When magnified, e.g. using the SEM technique, the tops of the walls of the craters may be seen to be frayed, tom and elongated.

A film fed into the above described compression molding process can be made by any known process including, but not limited to, solvent casting (for example, dispersion in a solvent, solvent including an aqueous medium), extrusion (for example, blown or casting), compression (for example, molding), roll milling or calendering, or any combination thereof. Extrusion as used herein is intended to include co-extrusion, extrusion coating or any combination thereof. One or more films may be laminated to form a multi-layer structure. Also, a film may be laminated to a woven or non-woven fabric forming a composite structure.

One or more layers of the film may be expanded, for example with a conventional blowing agent, to make a foamed film. To make foamed film structures or layers, either physical or chemical blowing agents may be used to achieve suitable foam densities, e.g. foam densities from 1 g/cm$^3$ to as low as 0.01 g/cm$^3$. Suitable blowing agents are known in the art the foams may be open or closed cell, according to ASTM D2856. The cell sizes of the foams typically are from about 0.01 mm to about 5.0 mm, preferably from about 0.02 to about 2.0 mm. The foams may be crosslinked or non-crosslinked.

A sheet can be made by any known process including, but not limited to, solvent casting, extrusion, roll milling, compression or calendering, or any combination thereof.

A coating can be made according to methods known in the art, e.g. by extrusion coating or involving a roller and doctor blading.

Fringed films, sheets, or coatings, and articles of manufacture comprising such fringed film, sheet or coating particularly benefit from the fringed surface microstructure. Performance attributes which can be specifically provided or enhanced by the fringed surface microstructure include soft, velvety and textile-like feel or touch, matte appearance, liquid repellency, anti-skid and good grip properties, surface variability and surface imprintability, controlled release properties, storage capabilities, and protective properties. Depending on the intended end-use application the fringed surface microstructure can be designed and optimized to specifically exploit or favor one or more of these performance attributes, for example by selection of a proper polymer material or polymer materials, and/or of a proper fringe structure. If desired or required, the fringed film, sheet or coating may be made to provide additional functional properties, such as breathability, increased heat resistance, or barrier properties.

The present invention also relates to an article of manufacture made from or comprising a fringed film, sheet or coating. Based on the specific advantageous performance attributes afforded by the fringed surface microstructure such articles of manufacture are useful, for example, for decoration or as decorative materials, for packaging or as packaging material, for use as labels or signs, in automotive applications, for industrial, personal or medical hygiene applications, for apparel or protective clothing, and for household applications.

More specifically, the fringed surface microstructure characterizing the articles of the invention affords an excellent soft, velvety and textile-like feel or touch, the fringed film, sheet, or coating of the present invention has improved haptics and is very pleasant and easy on a person's skin. Based on this property such fringed film, sheet, or coating is useful to manufacture plastic based articles for which such improved haptics are desirable, e.g. plastic articles of manufacture used in soft touch, soft feel applications. For example, soft touch, soft feel materials are desirable in the automotive industry, for example on automotive interior surfaces, including but not limited to instrument panels, console liners, door panels, seat covers, headliners, and steering wheel covers. The fringed films, sheets, or coatings according to the invention are also useful to make decorative fabrics or articles with (direct) skin contact, for example, furniture covers including outdoor furnishing, such as desk covers, cushions, including patio air cushions, drapes, bedspreads, and table cloths; ostomy bags; mattresses including air mattresses; life vests; artificial leather; floor covering; medicinal and personal hygienic articles, including for example bandages, band aids, condoms, incontinence articles, such as diapers, or parts thereof including e.g., top sheet, ears or wings, cuffs, side panels, and back sheets; (disposable) garments apparel, and protective gear; such as medical drapes and gowns, athletic clothing, raincoats, hats and caps; grip bands; (bag) handles; linings, for example for luggage, bags or handbags, or shoes; gloves, and protective gear, artificial skin, skin imitations, toys, industrial hygienic articles, such as wipes or disposable toilet seat covers, head rest covers and the like. For end-use applications requiring a soft feel the fringe length is advantageously at least about 150 microns or more. Generally, use of polymers having a low modulus polymer will be advantageous to obtain a soft feel. The use of polymers having a higher modulus will result in differentiated haptics and tacticity, affording a (relatively) rough feel rather than a soft feel. Such articles can be useful as scouring or abrading devices, or to provide anti-skid performance.

Another benefit provided by the fringed surface microstructure characterizing the film, sheet, or coating according to the invention is a matte (mat) appearance and further reduced gloss (relative to the precursor). Gloss is determined according to ASTM D2457. The films, sheets, or coatings according to the invention are useful to manufacture articles relying on excellent aesthetics and matte optical appearance including, for example, decorative overlays, including wall, floor, or ceiling covering products; artificial flowers; linings of jewelry boxes and luggage; anti-glare surfaces such as billboards and window cling sings, merchandise bags, and projection and movie screens.

Another advantageous property characterizing the fringed film, sheet, or coating is a differentiated surface tension, as determined by the test methods according to ASTM D-2578 or DIN 53364, and water contact angle. The fringed films, sheets, or coatings of the invention are useful for applications and articles where surface water or liquid drain management such that water beads up and drains off, is required, such as clothing with liquid repellant surfaces, e.g. rain gear, such as hats, coats, or ponchos, protective clothing, feminine hygiene top sheet, (disposable) table cloth and shower curtains.

Furthermore, the fringed surface microstructure also provides a frictional behavior, as reflected e.g. in the dynamic coefficient of friction, which affords anti-slip or anti-skid and better grip performance attributes to a fringed film, sheet, or coating, or an article of manufacture with a surface made from or comprising a fringed film, sheet, or coating of the invention. The dynamic coefficient of friction of a particular fringed surface may be determined according to ISO 8295, relative to various surfaces of interest, including, for example, the same or a different fringed surface, or a glass, metal, ceramic or polyolefin surface. The fringed surface microstructure provided herein typically provides an increased coefficient of friction as compared to non-fringed (plain) film of the same composition. The better grip and anti-slip properties make the fringed film, sheet, or coating of the invention useful for a variety of applications and articles including, but not limited to floor cover backings, furniture covers, gloves, table wear, bathroom articles, such as shower shoes and shower mats, roofing, tarps for construction, truck bed covers, box coatings, self-adhering closing systems, e.g. VELCRO™-like systems, serving trays (e.g. as used in air planes or restaurants), grip bands or tapes, and non-skid operation room table cover.

The process for making gloves comprises dipping hand forms into a suitable dispersion, such as latex. The hand forms are cleaned, rinsed and dried. Subsequently, the forms are heated and a coagulant for the latex is added to support curing of the latex. The latex is applied to the forms by dipping the forms into the latex bath. Before the product is cured any undesirable solvents or materials are allowed to leach out during a leaching step. The gloves may be removed from the form by blasting them off by air, which is rather difficult to accomplish, or by peeling the latex off the form while inverting it at the same time. Prior to the curing or leaching steps, the gloves may be dipped into a bath for coating with another material. For example, the coating may serve to enhance grippage, increase the wearer's ability to hold onto slippery or wet instruments or improve the feel against a person's skin. The continuous compression molding process according to the present invention can advantageously be used to make gloves with a fringed surface microstructure. In such process, the forms are employed as matrix surface. The peel/inversion process to remove the gloves from the form is applied such as to give the fringed surface micro-structure. Thus the secondary dipping step of the conventional process becomes redundant.

Another benefit afforded by the fringed surface microstructure is surface variability, particularly surface printability or imprintability (embossing), as reflected in the possibility to create distinct areas of different topography, e.g. using suitable impression techniques. The fringed surface may be (im)printed with or without ink. Printability may be evaluated in terms of ink adhesion, color density (vividness), print definition employing suitable methods known in the art, including for example adhesive tape peel tests, abrasion tests, or simply visual appearance. The ink may reside inside and/or between the fringes as well as at the tips or sides of the fringe. Acceptable ink adhesion is possible for water based and solvent based inks and should be selected based on the fringe layer polymer. Color density may vary dependent on the angle of view thus creating a unique 3D-type appearance. Clear fringed film may be reverse printed, e.g. by printing the fringed microstructure and viewing from the reverse side.

Using, for example, a hot stamp, hot air or friction to re-melt and/or compress part of the fringes in a selected regular or irregular pattern to form a smooth surface, haptic and/or optic effects are achieved by the resulting difference in surface structure and appearance. Thus printing effects may be obtained without the need for color or ink. If the difference in surface structure is marked, it may also be noticeable by a person with reduced visual ability or a blind person. Nevertheless, color or ink may be added to enhance the effects.

The desired imprinting effects may be realized relying on the same principles used in printing or sealing. For example, a stencil or print negative which is a metal or thermoset material that can be heated without distortion to temperatures above the melting point of the thermoplastic polymer forming the fringes may be employed. Suitable temperatures for polyethylene are in the range of from about 50° C. to about 200° C., preferably from about 60° C. to about 160° C., more preferably from about 70° C. to about 120° C. The image or pattern of the stencil or print negative is applied by pressing it on the fringed surface such that a three-dimensional effect is obtained. The effects are also obtainable in a process which does not involve contacting the fringed surface, e.g. by applying a jet of hot effluent (e.g. air) similar to an air brushing printing process. Another process suitable to obtain imprinting effects is to abrade the fringes on the surface by a mechanical process and thus create areas of differentiated topography resulting in print-like images. Alternatively, to obtain the described effects, the fringed surface may be created only on parts of the basic film, sheet, or coating 'a priori'.

The fringed surface microstructure can be printed with ink and resist ink from being scratched or abraded, thus enhancing the durability and appearance of the fringed article or item. The benefit of enhanced abrasion and scratch resistance is also afforded to coatings, such as barrier coatings, or metallization. By making the (barrier) coatings or deposits more scratch and abrasion resistant their particular properties will be maintained for a longer period of time. The advantage of improved scratch resistance also applies to printed or painted surfaces, e.g. in an automobile, such as dash boards, instrument panels etc., metallized films, e.g. used in the packaging of food, medical items or electronics, and barrier coated films.

Based on its surface variability and/or imprintability the fringed film, sheet, or coating of the present invention is particularly useful to make novelty balloons, book covers, wrapping paper, floor covering, ceiling covering or wall covering, labels, including, for example, in-mold labels and stretch labels, e.g. for bottles, bill boards, or paperboard coatings, e.g. for drinking cups, greeting cards, and party articles.

The increased surface area of the fringed film, sheet, or coating of the invention affords enhanced carrying, capturing or storing properties, which can be exploited for numerous applications and articles, including but not limited to articles comprising a controlled release system. For example, such system may provide for the controlled release of antibiotics and may be useful e.g. in wound covers or shower curtains, the controlled release of fragrances or the controlled release of drugs. Enhanced carrying, capturing or storage properties can also be exploited in wipes, tissues, carrier substrates for catalysis, filtration media, diaper top sheets, e.g. coated with diaper rash ointments, antistatic sheets, anti-fog films, and for HF weldability, thermal insulation, sound deadening, meat packaging and poultry diapers. Craters which are at least partially hollow provide a greatly enhanced surface area (e.g. as compared to a filled protrusion). The hollow tube structure has an outside surface, an inside surface, as well as the surface between the hollow tubes. The craters are suitable reservoir structures, which other substances can be embedded into or coated onto. Such reservoir structures allow, for example, the gradual diffusion or the controlled release of substances, such as drugs or fragrances. Such reservoir structures are useful e.g. in transdermal drug delivery systems, fragrance delivery systems, such as soft packages for cosmetics or perfumes, scented wall covering, or as filtration systems. A porous membrane may be put over the top of the reservoirs to allow the soft surface to breath to the skin (drugs) or air (fragrances). If a barrier, for example made from SARAN™ or EVOH resin, is coated over the top of the reservoirs and the base of the film is made from a porous material the drug is delivered through the base polymer. Emollients or salves can be placed in the reservoirs to maintain moistness for burn wounds or for diaper rash creams with the soft side against the skin. Antibacterial agents can be placed on the surface to prevent mold and mildew formation, e.g. in shower curtains. Placing a static charge on the surface further enhances the ability to pick up substances, such as dirt or dust.

Furthermore, absorbent materials can be coated onto the fringed surface or be incorporated into the polymer (as a type of filler) before the fringed film, sheet, or coating is made, for example in order to enhance the absorption of coatings or ink. Examples of suitable absorbent fillers include, for example, superabsorbents used in hygiene applications, talc and calcium carbonate.

The fringed film, sheet, or coating according to the invention may be made to be (moisture) vapor permeable or breathable. For example, breathable films include filled and stretched microporous films, or monolithic films, for example made from a thermoplastic polyurethane, a copolyesterether thermoplastic elastomer, a copolyesteramide thermoplastic elastomer or another highly water vapor transmitting polymer, such as a polyamide. A (thin) fringed layer may be coextruded on top of a previously stretched microporous layer or the fringed film can be stretched. A (thin) fringed layer can also be extruded on top of an inherently breathable monolithic layer. Water vapor breathability is a performance attribute desired or required for use of the fringed film, sheet, or coating of the invention in apparel, such as protective clothing, or in hygienic articles, such as (diaper) backsheet.

For example, a breathable monolithic fringed film is characterized by a high water vapor transmission rate (WVTR) and has a soft touch. In conventional breathable films, the soft touch has been provided by laminating a non-woven to the film. If desirable, the breathable monolithic fringed film may be laminated to another material which provides a different function in the composite, such as noise reduction or elastic recovery. Advantageously, the fringed surface microstructure is designed so as to provide the desired water repellency performance or liquid impermeability. Thermoplastic polymers suitable to make (inherently) breathable fringed film include, for example, polyether block copolymer (e.g., PEBAX™ copolymer), and thermoplastic polyurethane (e.g., PELLETHANE™ polymer). The films may be mono-layer or multi-layer structures, preferably each layer having a high WVTR. The WVTR measured at 38° C. and at 90% relative humidity (using ASTM method E96) should be in the range of 500 to 10,000 $g/m^2/day$, more typically in the range of 1000 to 6500 $g/m^2/day$. Such film is suitable for apparel or other applications for which breathability is desirable, including athletic wear, side panels in diapers or adult incontinence products.

The fringed films, sheets, or coatings according to the invention are useful for packaging applications, e.g. packaging applications requiring enhanced protection, e.g. against scratching, or cushioning, and/or printability. Exemplary packaging applications include pouches, e.g. pouches for flowable materials, such milk or detergent pouches, bags, e.g. boutique bags, and protective covers, e.g. for cars, bikes or boats. Fringed film, sheet, or coating comprising poly(lactide) are particularly suitable for disposable articles.

The fringed film, sheet or coating may be elastic. The elastic film of the invention comprises a material which is highly stretchable and which reverts to its original or nearly original form upon release of any pressure or force applied to the film material. In a preferred embodiment, the elastic film, sheet or coating of the invention achieves at least about 50 percent of its stretched length after the first pull and after the fourth pull to 100% strain (doubled the length). Recovery refers to a contraction of a stretched material upon termination of a force following stretching of the material. Percent recovery may be expressed as: [(maximum stretch length–final sample length)/(maximum stretch length–initial sample length)]×100. Elasticity can also be described by the "permanent set" of the film. Permanent set is the converse of elasticity. A film is stretched to a certain point and subsequently released to the original position before stretch, and then stretched again. The point at which the elastic material begins to pull a load is designated as the percent permanent set. Elastic polymeric materials include, for example, AB and ABA block or graft copolymers (where A is a thermoplastic endblock such as, for example, a styrenic moiety and B is an elastomeric midblock derived, for example, from conjugated dienes or lower alkenes), chlorinated elastomers and rubbers, ethylene propylene diene monomer (EDPM) rubbers, ethylene-propylene rubbers, thermoplastic polyurethanes, ethylene-alpha olefin copolymers, specifically at a density less than 0.89 g/cc, and ethylene-styrene interpolymers with a styrene content of less than 40 weight percent. Blends of these polymers alone or with other modifying elastic or non-elastomeric materials are also contemplated being useful in the present invention. The low modulus of elastic films is also advantageous in terms of haptics.

In a post-treatment step, the fringed film, sheet or coating according to the invention may be oriented according to methods known in the art.

If desired, the fringed film may be further treated (post treatment) and the surface characteristics of a fringed film may be modified by techniques known in the art, including, for example, corona treatment. Corona treatment increases the polarity of the surface, thus increasing the wetting tension. The greater the polar component the more actively will the surface react with different polar interfaces.

One aspect of the present invention relates to a mono-layer film, sheet, or coating, or articles of manufacture comprising such film, sheet, or coating, characterized by a fringed surface microstructure on one side, or on both sides. The fringed microstructure may cover parts of the surface, or the entire surface. Such mono-layer structure is preferably made from a suitable thermoplastic polymeric material indicated as being preferred herein-above. The mono-layer may be made from a single thermoplastic polymer, preferably an ethylene-based polymer, including for example a heterogeneously or, preferably, a homogeneously branched ethylene polymer, and a substantially random ethylene/styrene interpolymer, a polypropylene polymer, or a (poly) lactide, or a mixture or blend of thermoplastic polymers, preferably comprising the polymers indicated as being preferred. For example, a suitable polymer blend may be composed of two homogeneously branched ethylene-based polymers.

The present invention further provides a mono-layer or multi-layer film, sheet, or coating comprising a thermoplastic polymeric material, wherein the film, sheet, or coating, the thermoplastic polymeric material or both have been cured, irradiated or cross-linked. Advantageously, curing, irradiation or crosslinking is performed after forming of the fringed surface microstructure. Preferably, the cured, irradiated or cross-linked thermoplastic polymer is a polyolefin, most preferably an ethylene (inter)polymer. Crosslinking is achieved using the methods and techniques described in more detail herein-above. Such film, sheet, or coating affords the benefit of enhanced heat resistance, as required, for example, by applications in the automotive industry, such as automotive interior applications, such as steering wheel covers, or articles with much exposure to the sun, such as outdoor furniture cushion covers.

Generally, in a multi-layer film, sheet, or coating according to the invention, at least one layer has a fringed surface microstructure and is comprised of a thermoplastic polymer as defined herein. The fringed microstructure may be present on one or both sides of said layer or layers. The fringed layer may be an inner and/or, an outer layer. A multi-layer film, sheet or coating wherein the fringed layer is an outer layer are preferred.

In a multi-layer structure, each layer will serve a particular function or provide some characteristic to the overall structure. The composition of these layers is chosen depending on the intended end use application, cost considerations, and the like.

For example, layers may serve to provide particular structural or functional characteristics, e.g. add bulk to the structure, promote interlayer adhesion, provide barrier properties, thermal properties, optic properties sealing characteristics, chemical resistance, mechanical properties, or abuse resistance. An adhesion promoting interlayer is also referred to as a tie layer. If a barrier layer is desired or required for the intended end use application, it is selected so as to meet the targeted degree of gas or moisture (im)permeability.

Various materials can be used for these layers, with some of them being used in one or more than one layer in the same film structure. Suitable materials include, for example, nylon, ethylene/vinyl alcohol (EVOH) copolymers, polyvinylidene chloride (PVDC), polyethylene terephtalate (PET), oriented polypropylene (OPP), ethylene/vinyl acetate (EVA) copolymers, ethylene/acrylic acid (EM) copolymers, ethylene/methacrylic acid (EMAA) copolymers, LLDPE, HDPE, LDPE, graft adhesive polymers, such as maleic anhydride grafted polyethylene.

For example, a gas barrier layer may be made from vinylidene chloride copolymer, EVOH copolymer or SARAN™.

Examples of thermoplastic polymers appropriate for use in the seal layer include LLDPE, ULDPE, VLDPE, POP, EVA copolymer, EAA copolymer and ionomers.

Thermoplastic polymers for use in the bulk layer are advantageously chosen based on cost considerations and include recycled materials. Representative polymers are, for example, LLDPE, such as ethylene/butene copolymers, LDPE, EVA copolymer, (recycled) HDPE, polypropylene polymers and blends thereof.

Examples of thermoplastic polymers appropriate for use in a layer providing advantageous mechanical properties include, for example, ethylene/$C_4$–$C_8$ copolymers. The fringed multi-layer structures according to the invention typically consist of from two to seven layers. Preferred are multi-layer films having three or more layers.

Permeability may be provided by a porous membrane.

For example, it is within the scope of the present invention to provide a multi-layer film, sheet, or coating including the following general two-layer and three-layer structures, wherein the respective compositions of the layers are chosen from thermoplastic polymer resins which provide the requisite functional properties:

Fringed/Bulk
Fringed/Seal
Fringed/Adhesion
Fringed/Bulk/Seal
Fringed/Bulk/Adhesion
Fringed/Mechanical/Seal
Fringed/Mechanical/Adhesion
Permeability/Fringed/Barrier For each of these general structures, further internal or external layers may be added to promote inner layer adhesion or add bulk, as appropriate.

The present invention also relates to the use of a fringed film, sheet or coating, preferably a film, in a hygienic product, including a disposable hygienic product, such as feminine hygiene articles, bandages and wound cover materials, and incontinence articles, for example diapers.

The present invention also relates to the use of fringed film, sheet or coating in geomembranes.

Furthermore, the present invention relates to the use of a fringed film in medical ostomy bags, urological collection bags and other liquid containment pouches. Furthermore, the invention relates to medicinal collection bags, such as ostomy bags, urological collection bags and other liquid containment bags or pouches comprising a fringed film, particularly a multi-layer coextruded fringed film. The fringed surface microstructure is particularly advantageous and desirable for bags that are worn by a person and are in contact with his or her skin. Ostomy bags and urological collection leg bags are examples of patient-worn bags. In many commercial applications today, barrier films are combined with soft nonwoven textiles, such as spunbonded or meltblown polyolefin or polyester nonwovens, to provide a laminate structure that can provide patient comfort when worn in contact with the body. The use of fringed film to impart soft "nonwoven" or textile-like feel to a coextruded barrier film structure can result in elimination of a separate nonwoven textile from a laminated bag structure.

Of particular interest for incorporation of a fringed film are coextruded barrier films that provide good oxygen, carbon dioxide and odor barrier properties. Barrier properties can be achieved by use of conventional barrier polymers such as polyvinylidene chloride (PVDC, such as SARAN® resin from The Dow Chemical Company), ethylene-vinyl alcohol (EVOH, such as EVAL® resin from EVAL Company of America), nylon or amorphous nylon (such as GRILON® or GRILAMIDE® resin from EMS-Chemie, CAPRON® nylon from Allied Chemical or MXD6® nylon from Mitsubishi Gas Chemical Company), polyester (PET and PETG, such as EASTAR® polyester resins from Eastman Chemical Company) or phenoxy (such as BLOX® thermoplastic epoxy resins from The Dow Chemical Company). In producing a coextruded barrier film, it is desired to provide outermost film layers that provide strength and sealability such as with polyolefin resins. Suitable polyolefin resins include low density polyethylene (LDPE), linear low density polyethylene (LLDPE), high density polyethylene (HDPE), metallocene or plastomer polyethylene (mPE), ethylene-styrene Interpolymers (ESI), ethylene-vinyl acetate (EVA), ethylene methyl acrylate (EMA), ethylene-acrylic acid (EAA), and polypropylene homopolymer (PP) or polypropylene copolymer (coPP), chlorinated polyethylene (CPE), thermoplastic polyurethane (TPU), styrenic block copolymers such as styrene-butadiene-styrene (SBS) and styrene-ethylene-butylene-styrene (SEBS). These resins typically have poor affinity for and adhesion to the various barrier resins, necessitating the use of suitable tie layer resins to bond the layers together. The layers may include polyolefin copolymers that are polar monomer modified, such as ethylene copolymers with 1 to about 40 weight percent of polar comonomer. Suitable ethylene copolymers include EVA, EMA, EAA, ethylene-n-butyl acrylate (EnBA), and maleic anhydride (MAN) grafted polyolefins such as PE-graft-MAH, PP-graft-MAH and EVA-graft-MAH. These resins typically have 0.05–1.4 weight percent MAH grafted onto the polyolefin polymer.

Barrier films of the present invention are typically about 1.0 mils (25 $\mu$m) to about 10 mils (250 $\mu$m) in thickness, and preferably about 2.0 mils (50 $\mu$m) to about 6.0 mil (150 $\mu$m) in thickness. Thicknesses significantly greater than the preferred range can result is ostomy bags or collection bags that are stiff and inflexible, resulting in poor conformation to a patients body. This results in uncomfortable wearing of the bag, as well as aesthetically unacceptable bulging or protrusion of the bag from under the patent's clothing, eliminating the discreteness of wearing the appliance. In order to achieve good barrier properties, a typical barrier film will have a barrier layer of at least about 0.2 mils (5 $\mu$m) in thickness.

Suitable film structures Include, for example, a symmetrical five-layer film with a core barrier layer, adjacent adhesive layers on either side of the barrier layer, and outermost skin layers on each side of the film. Such multi-layer structure can symbolically be represented as a "ABCBA" structure, wherein the "C" layer is a barrier layer, the "B" layers are adhesive tie or bonding layers, and the "A" layers are skin layers. A representative 4.0 mil (100 $\mu$m) film might have a "C" barrier layer of PVDC or EVOH or PETG at 10% of the overall gauge; "B" adhesive tie layers of EVA or EVA-g-MAH at 10% each of overall gauge; and outermost "A" skin layers of LLDPE, mPE or coPP at 35% each of the overall gauge. This can be represented as a 35/10/10/10/35 layer ratio of the 4.0 mil (100 $\mu$m) film. A possible 5-layer asymmetrical film structure can be represented as ABCBD, wherein the "D" layer is a different skin material than the "A" material. Another representative barrier film structure that is useful in making ostomy or collection bags is a 4-layer asymmetrical structure. This can be represented as "ABCB" wherein the "C" layer is a barrier layer, the "B" layers are adhesive the or bonding layers, and the "A" layer is a skin layer. In this case, the exposed "B" adhesive layer can be used to thermally bond or seal two plies of the film together, such as during heat sealing of a bag seam.

For ostomy bags, urological collection bags and other appliances which are worn against the body, it is desired that they exhibit excellent haptics, softness and comfort. Use of woven and nonwoven laminates or coverings over the bag is commonly used to eliminate the direct contact of a plastic film against the skin. Direct contact of a smooth film can cause perspiration and "clinging" of the film to the skin, can cause blisters and sores to form due to abrasion against the skin in addition to hot and moist contact, and can promote bacteria or infectious growth between the bag and skin of the patient. The barrier properties of the containment bag or pouch, which are required to eliminate odor permeation of the excreted human waste products through the pouch, also prevent moisture in the form of skin perspiration from escaping from the region where the pouch or appliance is worm. Use of a one or two fringed layers according to the present invention as skin layer or layers 'A' provides the desired soft skin contact and can allow perspiration to escape from behind the appliance. It is further desired that films with low flexural or tensile modulus and low durometer "hardness" be used for the outermost layers of the film so as to provide a softer, more conformable surface. Elastomeric films, such as those made from TPU, CPE, styrenic block copolymers, ESI and homogeneous polyolefin resins, are especially preferred for coextruded layers on an ostomy or collection bag. These films also promote quietness, which a desired attribute of a bag or pouch appliance. A patient wearing a pouch desires the appliance not to make any noise or rustling sound while moving around, as commonly occurs when conventional plastic films are flexed, folded or "crinkled".

It is additionally desired to utilize plastic tubing and/or plastic fittings or connectors on the film utilized for medical bags, pouches or appliances. These fittings and tubing are usually made of a material compatible with the film and bondable to the film. Tubing or fittings may be made of polyolefins such as polyethylene, EVA or EMA, or of TPU or flexible vinyl (PVC). Film structure and surface compositions may need to be formulated so as to provide suitable bonding via thermal welding, impulse sealing, high frequency (also known as radio frequency) sealing or mechanical fastening. Additionally, use of liquid curable adhesives or hot melt applied adhesives can be utilized to adhere tubing or fittings to a bag structure.

In yet another aspect, the present invention relates to a floor or wall covering product comprising a fringed film, sheet or coating according to the invention. In a preferred embodiment, the floor or wall covering is a multi-layer film or sheet comprising at least one layer having a fringed surface microstructure. The product may further comprise an optional print layer, an optional reinforcement layer and/or an optional foam backing layer. In a wall covering product, the fringed layer may be present as the surface or top layer, the print layer or both. In a floor covering product, the fringed layer may be the surface layer, the print layer and/or the backing layer, the fringed microstructure facing the floor. Used as a surface layer, the fringed microstructure is designed to afford soft touch and feel and may be imprinted, if desired. If the fringed layer serves as a print layer, the fringed microstructure is designed to provide proper surface variability and imprintability. This layer is imprinted and preferably covered (on the top) by a transparent upper wear layer. As a backing layer the fringed layer affords anti-slip properties. If present, the reinforcement layer is an intermediate layer providing dimensional stability to the product, preferably a floor covering, which can be in excess of 4 meters in width. The optional intermediate reinforcement layer may be a melt processed polyolefin polymer or a non-woven or woven textile material. Preferably, the optionally intermediate reinforcement layer is a non-woven glass fleece material or a non-woven polymeric material. If present, the foam backing layer imparts resilient cushioning properties to the product and can also impart noise and thermal insulation characteristics to the product as well as provide a barrier against microorganisms. Suitable resilient foam backing layers comprise or consist of a solvent dispersed polyolefin polymer, a melt processed polyolefin polymer or a latex composition. The product may further contain appropriate additives, e.g. flame retardant additives to insure compliance with flame retardant requirements and other regulatory requirements.

Examples

The following Examples are illustrative of the invention, but are not to be construed as limiting the scope thereof in any manner. The following abbreviations are used: ESI= substantially random ethylene/styrene interpolymer; MFI or MI=melt flow index (measured at 2.16 kg/190° C. according to ASTM D-1238, condition E); N/T=not tested; the pressures are indicated in MegaPascal (MPa) and the temperatures are in degree Celsius.

Example 1

Preparation and Characterization of Fringed Films 1A–1D

FIG. 2 shows a schematic drawing of the calender used to make the fringed film. The calender comprises a steel pre-heat roll (11) with a diameter of 12.7 cm and 9 matrix roll (13) with a total diameter of 11.76 cm (10.16 cm diameter steel roll covered on each side with 0.8 cm of Viton™ rubber. The rubber is laser engraved with a regular pattern 0 0 0 0 of cylindrical dead-end holes (cavities, 2860 per square centimeter) which have a diameter of about 110 microns and a depth of about 270 microns. The center to center distances are 185 microns (closest neighbor) and 267 microns (diagonal neighbor).

For Fringed Films 1A and 1B, the (basic) smooth film fed into the calender via the feeder roll (10) is 100 microns thick and has the following general structure:

50% Outer Layer, 30% Core Layer, 20% Backing Layer.

The outer layer which comes in contact with the matrix roll and is converted into the fringed layer, is made from a blend consisting of 67% of a homogeneous substantially linear ethylene/octene copolymer (30 MI, 0.885 g/cc), 27% of a homogeneous substantially linear ethylene/octene copolymer (30 MI, 0.902 g/cc) and 6% of a Slip Masterbatch containing 5% erucamide in 6 MI, 0.900 g/cc polyolefin plastomer. The core layer consists of 87% LDPE (0.8 MI, 0.924 g/cc) and 13% $TiO_2$ Masterbatch (60% $TiO_2$ in LDPE or LLDPE). The backing layer consists of 92% HDPE (0.29 MI, 0.9605 g/cc) and 8% $TiO_2$ Masterbatch. The process is run with a 21 mils (=533 microns) negative gap width (applied maximum pressure in the gap of about 3–3.5 MPa (=30–35 bar), contact nip width of 12 mm. Line speed is 1 m/min. The winder speed is equal to line speed plus the necessary delta to maintain the given peel angle. The temperature of the chill roll (15) is 15° C. Hydraulic Pressure is the fluid pressure measured at the inlet to the pistons which apply pressure to the axis of the matrix roll. In this particular configuration the matrix roll presses against the pressure (preheat) roll. Film off the matrix roll is measured near point $P_1$ in FIG. 3. Matrix roll temperature is measured at angle $(\alpha)=90$ degrees (see FIG. 3).

FIG. 3 shows the parameters used in the calculation of the release angle ($\beta$) which is based on the equipment variables a (=4 inches), b (=2 inches), c (=1.38 inches), and d (=2.315 inches) as defined in FIG. 3, and on the wrap angle of the matrix roll (13). $\beta$ is the angle between the tangent to rubber roll at the point of detachment and the film. The angle is derived based on the rules of analytic geometry.

In FIG. 3, $O_1$ is the point of origin of the circle $C_1$, $O_2$ is the point of origin of the circle $C_2$, $P_1$ is the point of detachment from the matrix roll (13). $P_2$ is the point of touch to the chill roll (15), L is the length of the segment connecting $P_1$ to $P_2$, $\beta$ is the angle between the tangent to the matrix roll (13) at the point of detachment $P_1$ and segment L. Based on the method of calculation detailed below, the release angle calculates as 112.3.

The calculation of release angle is based on FIG. 3:
The length of the line segment L is given by, $$L=[[a+c+d\cdot(1-\cos\alpha)]^2+(d\cdot\sin\alpha-b)^2-a^2]^{0.5}$$

Replacing the origin of a rectangular coordinate system at $O_1$, the coordinates of the point $P_2$, (X,Y) have to be calculated. Equation(1) below describes a circle with radius L and origin $P_1$. Equation(2) describes the circle $C_2$ with radius a and origin $O_2$.

$$L=(x+d\cdot\sin\alpha)^2+(y-d\cos\alpha)^2 \quad \text{Equation (1)}$$

$$a^2=(x+b)^2+[y-(d+c+a)]^2 \quad \text{Equation (2)}$$

The values (X,Y) are obtained by solving Equations (1) and (2) simultaneously. This is equivalent to finding the points of intersection between the circles described by Equations (1) and (2).

The tangent to circle $C_1$ at $P_1$ is:

$$m_1=\tan\alpha$$

The slope of the line segment L is $$m_2 = \frac{Y-d\cdot\cos\alpha}{X+d\cdot\sin\alpha}$$

The angle between L and the tangent to $C_1$ at $P_1$ is $$\beta = \tan^{-1}\left(\frac{m_2-m_1}{m_1\cdot m_2+1}\right)$$

Because the intersection of the two lines gives rise to two complementary angles, the proper angle corresponding to ● is chosen by considering the geometry for given sets of equipment variables and wrap angle. For ●=60, ● is calculated as 112.3 degrees.

The calculation of the release angle assumes that the peeling is abrupt and the flexural modulus of the film is low. Sticky fringes may reduce the actual peel angle because they prevent the desired abrupt peeling. Furthermore, any bending moment in the film may reduce the peel angle. The following table correlates wrap angle and release or peel angle.

| Wrap Angle | Calculated Peel Angle |
|---|---|
| 0 | 25 |
| 15 | 45 |
| 30 | 68 |
| 45 | 90 |
| 60 | 112 |
| 75 | 133 |
| 90 | 151 |

The dimensional parameters characterizing the fringed microstructure are measured using a WYKO NT3300 Optical Profiler and the Vertical Scanning Inteferometry (VSI) mode. The sampling area is 460×600 square microns.

The following process conditions are used to produce Fringed Film 1A:
Wrap Angle: 75–90°
Peel Angle: 133–151°
Hydraulic Pressure (MPa): 17
Preheat distance on pressure roll: 4.5 cm
Film Temperature into gap: 98° C.
Film Temperature off Matrix Roll: 51° C.
Matrix Roll Surface Temperature: 61° C.
Pressure Roll Surface Temperature: 126° C.
Air Knife Delta: 20° C.
Preheat distance is the distance that the film is in contact with the preheat roll. The amount of preheat is dependent upon the distance and the line speed. Air knife delta is defined as the reduction in the matrix roll surface temperature as achieved by applying surface air to the back of the matrix roll as the process is running.

The fringe characteristics of Fringed Film 1A, as determined by optical surface profilometry, are as follows:
Fringe height (H): 237 microns
Fringe Diameter at base (D): 155 microns
Surface Area Ratio: 9.6
Hollow Depth Ratio (●): 1.1
Hollow Diameter Ratio (●): 0.52
Hollowness Index (●): 57
Aspect Ratio: 1.5

The following process conditions are used to produce Fringed Film 1B:
Wrap Angle: 60–75°
Peel Angle: 112–133°
Hydraulic Pressure (MPa): 17.1
Preheat distance on pressure roll: 22.5 cm
Film Temperature into gap: 91° C.
Film Temperature off Matrix Roll: 46° C.
Matrix Roll Surface Temperature: 59° C.
Pressure Roll Surface Temperature: 115° C.
Air Knife Delta: 13° C.
Preheat distance is the distance that the film is in contact with the preheat roll. The amount of preheat is dependent upon the distance and the line speed. Air knife delta is defined as the reduction in the matrix roll surface temperature as achieved by applying surface air to the back of the matrix roll as the process is running.

The fringe characteristics of Fringed Film 1B, as determined by optical surface profilometry, are as follows:
Fringe height (H): 220 microns
Fringe Diameter at base (D): 175 microns
Surface Area Ratio: 5.7
Hollow Depth Ratio (●): 0.5
Hollow Diameter Ratio (●): 0.35
Hollowness Index (●): 18
Aspect Ratio: 1.3

A smooth film (with a thickness of 100 microns) of the following structure and composition is used to make Fringed Film 1C:

50% Outer Layer, 30% Core Layer, 20% Backing Layer.

The outer layer which comes in contact with the matrix roll and is converted into the fringed layer, is made from a blend consisting of 52% of a homogeneous substantially linear ethylene/octene copolymer (30 MI, 0.885 g/cc), 22% of a homogeneous substantially linear ethylene/octene copolymer (30 MI, 0.902 g/cc), 20% of an ethylene/inyl acetate copolymer (8.0 MI, 12% VA) and 6% of a Slip Masterbatch containing 5% erucamide in 6 MI, 0.900 g/cc polyolefin plastomer. The core layer consists of LDPE (0.7 MI, 0.922 g/cc). The backing layer consists of HDPE (0.3 MI, 0.947 g/cc).

The process is run with a negative gap width of 12 mils (=300 microns) (applied maximum pressure in the gap of about 2.5 MPa (=25 bar), contact nip width of 9 mm). Line speed is 1 m/min. The winder speed is equal to line speed plus the necessary delta to maintain the given peel angle. The temperature of the chill roll is 200 C.

The following process conditions are used to produce Fringed Film 1C:
Wrap Angle: 15°
Peel Angle: 450
Hydraulic Pressure (MPa): 16.5
Preheat distance on pressure roll: 22.5
Film Temperature into gap: 91° C.
Film Temperature off Matrix Roll: 75° C.
Matrix Roll Surface Temperature: 75° C.
Pressure Roll Surface Temperature: 117° C.

The fringe characteristics of Fringed Film 1C, as determined by optical surface profilometry, are as follows:
Fringe height (H): 335 microns
Surface Area Ratio: 17.4
Hollow Depth Ratio (●): 1.0
Hollow Diameter Ratio (●): 0.76
Hollowness Index (●): 76
Aspect Ratio: 2.8
Fringed Film 1C shows that the presence of a polar comonomer in the fringed layer results in long(er) fringes with a high(er) Hollowness Index.

A smooth film (with a thickness of 100 microns) of the following structure and composition is used to make Fringed Film 1D:

50% Outer Layer, 30% Core Layer, 20% Backing Layer.

The outer layer which comes in contact with the matrix roll and is converted into the fringed layer, is made from a substantially random ethylene/styrene interpolymer containing 30% of styrene comonomer (25 MI). The core layer consists of LDPE (0.7 MI, 0.922 g/cc). The backing layer consists of HDPE (0.3 MI, 0.947 g/cc).

The process is run with a negative gap width of 12 mils (=300 microns) (applied maximum pressure in the gap of about 2.5 MPa (=25 bar), contact nip width of 9 mm). The line speed is 1 m/min, the chill roll temperature is 20° C.

The following process conditions are used to produce Fringed Film 1D:
Wrap Angle: 300
Peel Angle: 680
Hydraulic Pressure (MPa): 17.6
Preheat distance on pressure roll: 4.5 cm
Film Temperature into gap: 49° C.
Film Temperature off Matrix Roll: 54° C.
Matrix Roll Surface Temperature: 55° C.

The fringe characteristics of Fringed Film 1D, as determined by optical surface profilometry, are as follows:
Fringe height (H): 174 microns
Surface Area Ratio: 3.65
Hollow Depth Ratio (●): 0.48
Hollow Diameter Ratio (●): 0.55
Hollowness Index (●): 26
Aspect Ratio: 1.5

Example 2

Scanning Electron Microscopy (SEM) of a Fringed Film

A three-layer fringed film (layer ratios: 60% fringed layer/20% core/20% outside) is evaluated using Scanning Electron Microscopy. The fringed layer, namely the layer with the fringed surface microstructure, is made from a blend of 6 weight percent of slip masterbatch, 27 weight percent of a homogeneous ethylene/octene copolymer having a density of 0.885 g/cc and a MFI of 30 g/10 min and 67 weight percent of a homogeneous ethylene/octene copolymer having a density of 0.902 g/cc and a MFI of 30 g/10 min. The core layer is made from 85 weight percent of a LDPE having a density of 0.923 g/cc and a MFI of 0.7 g/10 min(LDPE 300R available from The Dow Chemical Company) and 15 wt. % White Masterbatch. The outside layer is made from 94 weight percent of a LLDPE having a density of 0.912 g/cc and a MFI of 1.0 g/10 min (ATTANE™ SL 4101 resin available from The Dow Chemical Company), and 6 weight percent of White Masterbatch.

A portion of the fringed film is cut and mounted on an aluminum sample stub with conductive carbon tape and carbon paint. The sample is coated with approximately 60 Angstroms of chromium using a Denton Hi-Res 100 chromium sputtering system, then examined and photographed using a Hitachi S-4100 FEG SEM. All photographs are taken at 2.0 kV accelerating voltage. Photographs are taken at 50×, 250×, and 500× magnification.

When magnified using the SEM technique, the top view surface of the film exhibits a pattern or matrix of hollow tubes or cylinders that emerge from the base film. One is able to see into the tube as it is open on top but closed at the bottom by the base film. Such hollow tubes can also be described as craters. The walls of the craters or tubes are raised from the base film. The cross-sectional view of the film, cutting through the center of the tubes, exhibits peaks for the walls of the tubes or craters, followed by valleys which exhibit the crater holes themselves as well as the surface of the base film which is between the craters as dictated by the base pattern.

Example 3

Fringed Film treated by Electron Beam Crosslinking

Specimens of the fringed film of Example 2 are treated via electron beam crosslinking. The film specimens are placed in cardboard fileholders and irradiated using a 12 MeV, 10 kW electron beam source at Sterigenics International, Inc. (San Diego, Calif.). The radiation dose per pass is 32 kGrays (3.2 Mrad). Three fringed specimens are exposed to the beam multiple times to give total dosage levels of 160, 288 and 448 kGray (16, 28.8, 44.8 Mrad), respectively. The gel content (insoluble fraction) of the crosslinked films is determined by xylene extraction per ASTM D2765 method, Procedure A with two exceptions. The films are not conditioned and are tested as received without grinding. The ASTM D-2769 method involves placing about 0.3 g of sample into a sample holder made of stainless steel wire cloth. The sample holder is then immersed into a three neck round bottom flask containing xylene boiling in reflux condition and an antioxidant (0.85% (w/v) 2-2'-methylene-bis-(4-methyl-6-tertiary butyl phenol)). Samples are kept in xylene for 12 hours and are then transferred to a vacuum oven preheated to 150° C. The samples are dried in the oven for 12 hours under at least 28 in Hg vacuum. After an hour of cooling the sample holders are weighed. The difference in weight before and after extraction is used in the calculation of gel content. The results of the gel testing are as follows:

| Sample | Radiation Dose, kGy | % Gel (Average) |
| --- | --- | --- |
| Sample 3-A | 160 | 20.3 |
| Sample 3-B | 288 | 48.6 |
| Sample 3-C | 448 | 54.6 |

Samples 3-A, 3-C, and a non-crosslinked control are also exposed to heat using a hot plate to evaluate the ability of the various samples to maintain their surface texture. The samples are mounted on glass slides, then placed on a hot plate and exposed to 60°, 70°, 80°, 90° and 110° Celsius. each for 10 minutes. After being cooled to room temperature, the films are evaluated using the SEM technique described in Example 2 to determine the ability of the fringed surface observed at room temperature to remain intact. At room temperature the surface of the tubes or craters is very sharp or vivid. The edges of the frayed tops are very thin and wispy in nature. The tops of some of the tubes or craters appear to overlap or touch the surfaces of the other tubes (Condition 0). As the surface becomes affected by rising temperature the frayed, thin, wispy tops first begin to become more isolated with less overlapping to other craters indicating that they are beginning to shrink back to the domain of their tube (Condition 1.0) and then eventually there is no overlapping of the wispy tops (2.0). With increasing heat the tops of the surfaces become more regular and oval and appear to be thicker and not at all frayed or wispy and the distance between the tubes or craters becomes smaller as do the distances between the craters (Condition 3). Eventually the diameter of the crater becomes much smaller as do the distances between the craters as the wall shrinks closer to the base of the film. At this point the definition of the craters is considerably less discernable than Condition 3 but still observable (Condition 4). The final view is when the craters have completely shrunk back into the base of the film and are no longer discernable (Condition 5). The rating of the various samples are provided below.

| Temperature | Control | Sample 3-C | Sample 3-A |
| --- | --- | --- | --- |
| 25° C. | Condition 0 | N/T | N/T |
| 60° C. | Condition 1 | Condition 0 | N/T |
| 70° C. | Condition 1 | Condition 0 | N/T |
| 80° C. | Condition 2 | Condition 1 | N/T |
| 90° C. | Condition 2 | Condition 1 | Condition 2 |
| 110° C. | Condition 5 | Condition 3 | Condition 4 |

As observed by SEM the highest level of crosslinking (Sample 3-C) appears to postpone the loss of the frayed, wispy appearance until 80° Celsius. as compared to the 60° Celsius. for the non-crosslinked control. The lowest and highest level of crosslinking both prevent the surface from completely melting at the 110° C., with the highest level of crosslinking keeping it most intact.

This example demonstrates the ability of cross-linked fringed films to increase the upper service temperature of the films. Applications benefiting from enhanced temperature resistance include, for example, automotive interior applications such as fabric or vinyl door panels, instrument panels, dash boards and headliners, as well as outdoor furniture cushion covers (capable of withstanding high temperatures in Arizona sun or attic conditions).

Example 4

Printing Tests

I. The film of Example 2 is evaluated for printability. The first printing test involves a non-contact printing apparatus, a Marsh LCP ML4 Ink Jet System which is used to print polyethylene heavy duty shipping sacks. The ink used is a methyl ethyl ketone based Printing Ink by Marsh Called UN 1210 FD. The FD indicates fast drying. The bags move by on a conveyor belt and when they pass an electronic eye the lot number or product type is printed on the side of the bag in a macro dot matrix form. The tested versions are a non-textured control sample and a fringed film sample, each having the structure and composition of the film of Example 2. Approximately 4 inch×4 inch samples are taped to the side of a bag which is run past the electronic eye.

Printed Appearance: the printed appearance of the control film is very glossy and one can see the raised ink dots which sit on the top of the film. The fringed film has a mat finish and the dots do not at all appear raised but sunk into the film. It has a softer appearance.

Smudge/Smear Test within 30 seconds the bags are tested for smudging by lightly wiping a finger across the surface of each specimen. None of the specimens exhibits smudging.

Ink Adhesion: immediately following the smudge test, the bags are evaluated for ink adhesion. Strips of adhesive tape approximately 0.5 inch×2 inch are pressed with moderate but consistent pressure across the surface of each film and are then peeled away from the films. A qualitative analysis gives the following results:

non-textured control film: approximately 60–75 percent of each ink dot is removed;

fringed film: approximately 10–20% of each ink dot is removed.

The fringed sample exhibits significantly improved ink adhesion relative to the non-textured sample. Even after applying the adhesive tape with dramatically higher pressures to the fringed sample the removal of ink is still approximately half of what is observed with the non-textured film with the tape applied only at moderate pressures. The level of ink adhesion to the films after a week of sitting at room temperature remains consistent with what is observed immediately after the printing.

Ink Abrasion/Scratchability: the specimens are also evaluated by simple abrasion and scratch tests. The abrasion test involves wiping a pencil eraser head across a single dot in a back and forth motion until it appears that no change in the color intensity of the dot is observed by additional wiping. The scratch test involves scraping a moderately sharp implement such as a coin or a fingernail across the printed film surface and observing the ability of the ink to remain in place. The results of these two tests are described below.

| Sample | Abrasion Test | Scratch Test |
| --- | --- | --- |
| Non-Textured Film | Within 5 strokes of the eraser the surface ink dot is removed and only a light stain remained below. | Ink is easily scraped off by scraping a sharp implement across the surface. Entire dots can be removed after repeated scrapings with a light stain remaining below. |
| Fringed Film | After 25 strokes of the eraser the ink dot is still not removed from the film surface and the remaining dot looks significantly darker than the light stain of the non-textured film | Single swipes across the dots reveal no obvious change in the ink dots. Repeated swipes are able to lighten the dots but do not approach ink removal achieved by the eraser. |

II. Another printing test involves evaluation of a three-layer fringed film (layer ratios: 50% fringed/30% core/20% outside) of the following composition:

fringed layer: 6 wt. % slip masterbatch, 27 wt. % of a homogeneous ethylene/octene copolymer having a density of 0.885 g/cc and a MFI of 30 g/min, 67 wt. % of a homogeneous ethylene/octene copolymer having a density of 0.902 g/cc and a MFI Of 30);

core layer 87 wt. % LDPE 300R, 13 wt. % White Masterbatch;

outside layer 92 wt. % ATTANE SL 4101, 8 wt. % White Masterbatch.

The fringed film is evaluated on an ink jet desktop printer typically used for printing paper items. A smooth (non-textured) base film of the corresponding structure and composition is used as control film.

Appearance of the films: on the non-textured film ink beads up on the surface and wetted well outside of the boundary of the dot pattern common to ink jet printers. The appearance is blurred. The fringed film does not bead up and shows significantly better definition of the dot pattern. In addition, it has a very matte finish and appears to have the appearance of a soft-colored pencil look as opposed to a typical ink link. The physical multi-dimensionality of the film surface appears to create a visual three-dimensional appearance as well. This effect provides an enhanced and improved visual appearance giving a greater depth or creating a better shading effect by alternating colors. Such soft shading effect or multidimensional effect can benefit various applications for which the (visual and haptic) depth appearance of a textile in combination with the cleanability of a plastic are desired including, for example, doll skins and automotive seats.

Smudge test: a finger smudge test is conducted after 12 hours revealing that ink on both the non-textured control and the fringed film is not completely dry. The ink on the non-textured film smudges beyond the boundaries of the printed object and smears onto the rest of the film. The ink on the fringed film comes off on the finger, but does not appear to smudge beyond the boundary of the printed object. This finding could indicate that the ink on the fringed is more firmly encapsulated in the hollow tubes of the film.

Inspection by microscopy of the top view of the ink jet printed fringed surface reveals that the ink resides on the tips of the fringe, in between the fringe, as well as in the recessed centers of the craters.

Example 5

Pouch Comprising a Multi-Layer Fringed Film

A coextruded 5-layer barrier film is made on a conventional upward blown 5-layer film line. The 5.0 mil (125 μm) thick film is comprised of a outermost layer of homogeneous polyethylene copolymer, an EVA adhesive the layer, a PETG core barrier layer, an EVA adhesive be layer, and a ULDPE-LDPE blend innermost skin layer (ABCBD structure). The outermost layer is 50% (2.5 mil, 62 μm) of the film gauge and consists of 96% Affinity™ SM1300 (The Dow Chemical Company, 0.902 g/cc, 30 g/10 MFI) and 4% CN4420 slip/antiblock concentrate (20% silicon dioxide, 3.5% stearamide, 3.5% erucylamide in EVA resin). The two EVA tie layers are each 10% (0.5 mil, 12 μm) of the film gauge and consist of 100% Elvax™ 3190 (DuPont, 25% vinyl acetate, 0.95 g/cc, 2.0/10 MFI). The core PETG copolyester layer is 10% (0.5 mil, 12 μm) of the film gauge and consists of 100% Eastar™ 6763 PETG (Eastman Chemical Company, 1.27 g/cc, 0.70 inherent viscosity). The innermost skin layer is 20% (1.0 mil, 25 μm) of the film gauge and consists of a blend of 60% Attane™ 4201 ULDPE (The Dow Chemical Company, 0.912 g/cc, 1.0 g/10 minute melt index) and 40% LDPE 6811 (The Dow Chemical Company, 0.922 g/cc, 1.2 g/10 minute melt index).

The Affinity™ layer is extruded at a temperature of 280° F. (138° C.); the EVA layers are extruded at 325° F. (163° C.); the PETG layer at 400° F. (204° C.) and the ULDPE-LDPE innermost layer is extruded at 340° F. (171° C.). The 5 inch (12.7 cm) diameter tubular blown film die is heated at 340° F. (171° C.). After cooling the blown tube with a dual lip air ring, the tube is collapsed to form a 15 inch (38 cm) wide lay flat, slit into two separate webs and wound into film rolls.

In a separate operation and using the equipment described in Example 1 and FIG. 2, the film is subjected to a fringing process, wherein the outermost Affinity™ layer is provided with a fringed surface microstructure. The fringe length is about 300 μm.

The resulting fringed film exhibits a soft, velour or fabric-type feel. Closed ended pouches of the fringed film are fabricated using a heated 1-liter bag die mounted on a heated press (Sentinel 808 heat sealer) using a temperature of 325° F. (163° C.) and 4 second dwell. Two plies of the film are oriented such that the fringed Affinity™ resin layer of each ply is on the outside of the pouch and the ULDPE-LDPE blend layer is on the inside with the heat seal causing the ULDPE-LDPE layer of one ply to bond to the same layer of the second ply around the perimeter of the pouch die. Films are tested for machine direction (MD) and transverse direction (TD) physical properties according to ASTM D-882 both before fringing (initial base film) and after fringing (fringed film). In addition, oxygen transmission rate ($O_2TR$) is tested according to ASTM D-3985 using a Mocon Ox-Tran 1050 permeability tester and water vapor transmission rate (WVTR) is tested according to ASTM F-1249 using a Mocon Permatran W-600 permeability tester.

A 4-layer coextruded fringed film similar to that described above is produced, with the modification that the 10% PETG core barrier layer is replaced with a 10% layer of PVDC. A blend of 96% Saran™ 469 PVDC (The Dow Chemical Company) and 4% Elvax™ 3180 EVA (DuPont, 28% vinyl acetate, 0.95 g/cc, 25 g/10 MFI) is extruded at 310° F. (154° C.) in the centermost layer of the 5 layer asymmetrical structure. The resulting film is subjected to fringing as described above.

Example 6

Coefficient of Friction (COF)

A smooth base film (6A) (control), a fringed film (6B) having a fringe height (H) of 70 microns (6B) and a Hollowness Index (●) of 43, and a fringed film (6C) having a fringe height (H) of 95 microns and a Hollowness Index (●) of 60 are tested for their frictional behavior. All films are three-layer films and have the same structure and composition of the film 1A described in Example 1. Fringe height (H) and Hollowness Index (●) are determined via optical microscopy using an Olympus Vanox-S Model AH-2 research microscope and the following instrument conditions: transmitted light using Nomarski interference contrast at magnifications of 100× and 200× with a Polaroid DMC le digital camera. The samples are prepared as follows: cross sections having a thickness of 2.5 microns are taken from a portion of the film with a diamond knife on a Leica Ultracut-UCT equipped with an FCS cryosectioning chamber. Films having short fringes (<75 microns in length) are cut at −120° C. Films having longer fringes are embedded in Paraplast™ wax (a tissue embedding medium manufactured by Oxford Labware). Embedding consists of placing a few drops of melted wax on the film surface with the fringes. The samples are placed in a vacuum oven at 55° C. and 30 in Hg. for approximately 30 minutes. The cross sections are placed on glass slides containing a suitable immersion oil and analyzed.

The kinetic coefficient of friction according to ASTM method D1894 is measured for different surfaces:
a) Fringed side of film (or corresponding side for film 6A) to metal
b) Fringed Side of Film to Fringed Side of Film
c) Wet Fringed Side of Film to Wet Metal.

For test c), the ASTM method is slightly modified. The film is soaked in deionized water at ambient temperature for 24 hours prior to testing. The metal surface is covered with water, 1–3 mm deep.

The results of test a) (fringed vs. metal) show that fringing causes an increased COF as compared to the smooth film. The average COF of 5 measurements measured on the fringed films 6B (COF=1.2) and 6C(COF=2.65) is significantly higher than the COF measured for film 6A (COF=0.1). The results of test b) (film vs. film) show that fringing causes an increased COF as compared to the smooth film. The average COF values measured for films 6A, 6B and 6C are 0.2, 0.3 and 1.4, respectively. The COF for film 6C is found to increase over the distance traveled by the sled (tested range: 0 to 400 inches). The results of test c) (wet film vs. wet metal) show that the fringe must be of a certain length to obtain increased COF versus the base. The average COF values measured for films 6A, 6B and 6C are 0.1, 0.1 and 1.1, respectively. The COF values for films 6B and 6C are found to increase over the distance traveled by the test (range tested: 0 to 400 inches).

Example 7

Hot Tack Testing

Hot tack testing is accomplished using a Topwave Hot Tack Tester Model 52D. The test is conducted at 40 psi bar pressure, 0.5 sec dwell time, 0.2 sec delay and 200 mm/min peel speed. The hot tack tests are conducted on the samples, whereby one inch wide strips of film are cut and the matrix layer is folded over and pressed to itself by the hot tack tester. The hot tack tester stays closed for the specified dwell time, it releases the jaws for the delay time and the seal is pulled at the designated peel speed. Hot tack seals are made at 10° Celsius increments from 80–150° C. Celsius. Hot tack initiation temperature is defined as the point at which the hot tack strength achieves 2 N/2.54 cm. The ultimate strength achieved over the tested range is called the ultimate hot tack strength.

A smooth base film (7A) (control) and a fringed film (7B) having a fringe height (H) of 250 microns (7B) are tested for their hot tack performance. Both films are three-layer films and have the structure and composition of film 1A described in Example 1, above. Fringe height (H) is determined via optical microscopy according to the method described in Example 6. As compared to the base film 7A, the fringed film 7B shows an improvement, that is decrease in hot tack initiation temperature of 12° C. (83° C. for 7B, 95° C. for 7A) and in ultimate hot tack (4.26 for 7B, 2.78 for 7A). The ultimate hot tack strength is found to increase with increasing fringe heights.

Example 8

Water Repellency of Fringed Film

To examine the water repellency or water management characteristics of fringed film the water contact angle test is utilized. Testing is done according to ASTM-D5946 utilizing method 1 in 3.1.2.1. In this test method water droplets are placed on the surface of a film sample, and the contact angle values are then averaged. The contact angle is measured directly with a protractor by using a tangential alignment of a crosshair line to the point at which the side of the water droplet contacts the substrate. Water contact angle can then be related to a wetting tension via a conversion chart. The test is used to compare the effect the fringed surface microstructure has on the water repellency or the ability to enable the water to bead up on the surface. The water contact angle is measured using pH 7 buffer solution.

The test is performed on films having the same structure, composition and fringe characteristics as films 6B and 6C described in Example 6 and are referred to as film 8A (fringe height (H) of 70 microns) and 8B (fringe height (H) of 95 microns) in this example. Two separate areas per film were evaluated and the values averaged. The average water contact angle determined for film 8A is 137.3, the average water contact angle for film 8B is 155.4. The results show that increased fringe length results in an increased water contact angle, indicating an increased ability to bead up water on the surface. Such effect is important for applications requiring water repellency, such as raincoats and other water repellant outerwear, house wraps, feminine hygiene and diaper top sheets, and (latex) gloves (prevent formation of a slippery surface).

What is claimed is:

1. A mono-layer or multi-layer film, sheet, or coating comprising at least one layer that displays a surface microstructure, which layer is a thermoplastic polymeric material having fringes, wherein said fringes are non-perforated and are at least partially hollow with at least about 25 percent of the volume at the top of the fringe being empty and have a height of at least about 40 microns or more, in a density of 1000 or more per square centimeter.

2. A film, sheet or coating according to claim 1, wherein the fringes have a height in the range of from 40 microns to 1 millimeter.

3. A film, sheet or coating according to claim 1, wherein the fringes have a hollow depth ratio, which is the ratio of the average inner height to the average maximum height of the fringe, of 1.3 or lower, as determined by optical surface profilometry.

4. A film, sheet or coating according to claim 1, wherein the fringes have a hollow diameter ratio, which is ratio of the diameter of the hollow center at half height and the diameter at the bottom of the fringe, of 1 or lower, as determined by optical surface profilometry.

5. A film, sheet or coating according to claim 1, wherein the fringes have a Hollowness Index of 100 or lower, as determined by optical surface profilometry.

6. The film, sheet or coating according to claim 1, wherein the fringes have an aspect ratio, which is the ratio of the fringe height and the fringe diameter, of between 1 and 5.

7. The film, sheet, or coating according to claim 1, wherein the thermoplastic material is cured, irradiated or cross-linked.

8. The film, sheet, or coating according to claim 1, wherein the layer displays a surface microstructure on both sides.

9. The film, sheet, or coating according to claim 1, which is a mono-layer film, sheet or coating.

10. The film, sheet, or coating according to claim 1, which is a multi-layer film, sheet or coating.

11. The film, sheet, or coating according to claim 10, wherein the surface microstructure is on an outer layer.

12. The film, sheet, or coating according to claim 1 which is a multi-layer film, sheet or coating, wherein the surface-structured layer is an interlayer.

13. The film, sheet or coating according to claim 10, wherein at least one of the outer layers is a fringed layer and at least one of the inner layers is an oriented film, preferably a biaxially oriented polypropylene film.

14. The film, sheet or coating according to claim 13, wherein at least one of the layers is a foamed layer.

15. The film, sheet, or coating according to claim 1, wherein at least one layer is elastic.

16. The film, sheet, or coating according to claim 1, which is oriented.

17. The film, sheet, or coating according to claim 1, wherein at least one layer is vapor permeable and liquid impermeable.

18. The film, sheet, or coating according to claim 1 which is printed or imprinted.

19. The film, sheet or coating according to claim 1 wherein the surface microstructure has been subjected to a post treatment step selected from the group consisting of treatment with an abrading device, corona treatment, curing, irradiation and crosslinking.

20. A composite comprising a mono-layer or mufti-layer film, sheet, or coating wherein at least one layer displays a surface microstructure, which layer is a thermoplastic polymeric material and characterized by fringes, wherein said fringes are non-perforated and are at least partially hollow with at least about 25 percent of the volume at the top of the fringe being empty and have a height of at least about 40 microns or more, in a density of 1000 or more per square centimeter.

21. The composite according to claim 20 which is a laminate.

22. An article of manufacture comprising a mono-layer or multi-layer film, sheet, or coating wherein at least one layer displays a surface microstructure, which layer is a thermoplastic polymeric material and characterized by fringes, wherein said fringes are non-perforated and are at least partially hollow with at least about 25 percent of the volume at the top of the fringe being empty and have a height of at least about 40 microns or more, in a density of 1000 or more per square centimeter.

23. The article of manufacture according to claim 22, which is a glove.

24. The article of manufacture according to claim 22, which is a hygienic product.

25. The article of manufacture according to claim 22, which is a medicinal collection bag.

26. The article of manufacture according to claim 22, which is a floor or wall covering product.

27. The article of manufacture according to claim 22 which has a soft touch.

28. The article of manufacture according to claim 22 which is water repellant.

29. The article of manufacture according to claim 28 which has anti-skid properties.

30. The article of manufacture according to claim 22 which has enhanced carrying, capturing or storing properties.

31. The article of manufacture according to claim 22 which is heat resistant.

32. A process for making the mono-layer or multi-layer film, sheet, or coating according to claim 1, said process comprising
forming a precursor film, sheet, or coating with a surface characterized by a pattern of peaks and valleys in a continuous compression molding process, and
subjecting said precursor to mechanical treatment comprising the application of a tractive force which is applied during release of the film, sheet or coating from a matrix surface under conditions allowing the formation of a fringed surface microstructure.

33. The process according to claim 32, wherein application of the tractive force comprises peeling the film, sheet, or coating off the matrix surface at a temperature which is at or below the Vicat softening point of the thermoplastic material and at a release angle of between 20 and 170 degrees relative to the matrix surface.

34. The process according to claim 32, wherein the precursor is a foam.

* * * * *